United States Patent
Moreland et al.

(10) Patent No.: US 11,524,672 B2
(45) Date of Patent: Dec. 13, 2022

(54) CONTROL TECHNIQUES FOR CONTROLLING ELECTRIC HYBRID RETROFITTED VEHICLES

(71) Applicant: Elephant Racing LLC, Santa Clara, CA (US)

(72) Inventors: Charles Edward Moreland, San Jose, CA (US); William Dean Davis, Union City, CA (US)

(73) Assignee: Elephant Racing, LLC, Santa Clara, CA (US)

( * ) Notice: Subject to any disclaimer, the term of this patent is extended or adjusted under 35 U.S.C. 154(b) by 349 days.

(21) Appl. No.: 16/584,925

(22) Filed: Sep. 26, 2019

(65) Prior Publication Data

US 2020/0094810 A1 Mar. 26, 2020

Related U.S. Application Data

(60) Provisional application No. 62/763,920, filed on Sep. 26, 2018.

(51) Int. Cl.
*B60W 20/10* (2016.01)
*B60K 6/26* (2007.10)
(Continued)

(52) U.S. Cl.
CPC .............. *B60W 20/10* (2013.01); *B60K 6/26* (2013.01); *B60K 6/485* (2013.01); *B60K 6/54* (2013.01);
(Continued)

(58) Field of Classification Search
CPC . B60K 6/38; B60K 6/405; B60K 6/26; B60K 6/485; B60K 6/54; B60K 2025/005;
(Continued)

(56) References Cited

U.S. PATENT DOCUMENTS

| 5,469,816 A | 11/1995 | Murakawa | B60L 7/14 180/65.285 |
| 6,040,634 A | 3/2000 | Larguier | B60L 15/20 290/45 |

(Continued)

FOREIGN PATENT DOCUMENTS

| CN | 101075770 A | 11/2007 |
| EP | 2371646 A1 | 10/2011 |

(Continued)

OTHER PUBLICATIONS

Vonnen: "Vonnen-Electric Boost for Your Porsche . . . Lots of It", Youtube, Feb. 28, 2019, XP054980250, pp. 1-1,Retrieved from the Internet: URL: https://www.youtube.com/watch?v=UkeNhP5bVMM.

(Continued)

*Primary Examiner* — David J Hlavka
(74) *Attorney, Agent, or Firm* — Adibi IP Group, PC; Amir V. Adibi; Andrew C. Palmer

(57) ABSTRACT

An electric motor drive retrofit system (EMDRS) comprises a power system, an energy storage system (ESS), a cooling system, a vehicle control unit (VCU), and a user interface device (UID). A non-hybrid combustion engine drive vehicle with tight space constraints is retrofittable with the EMDRS to provide hybrid drive functionality. EMDRS includes a motor generator unit (MGU) coupled to a motor control unit that transfers charge between MGU and ESS. During retrofit, the MGU is coupled between a transmission and an internal combustion engine (ICE) of the vehicle without extending a powertrain length by more than five inches. VCU does not interfere with any pre-existing vehicle electronics. The VCU controls the EMDRS to add torque (discharging ESS) or to remove torque (charging the ESS) based on a selected operating mode and vehicle sensor (Continued)

VEHICLE WITH REAR INTERNAL COMBUSTION ENGINE
(BEFORE RETROFIT)

information (for example, brake and throttle pressure). Operating modes are selected by driver via the UID.

20 Claims, 26 Drawing Sheets

(51) Int. Cl.
| | | |
|---|---|---|
| *B60K 6/54* | (2007.10) | |
| *B60W 10/06* | (2006.01) | |
| *B60W 10/08* | (2006.01) | |
| *B60K 6/485* | (2007.10) | |
| B62D 65/10 | (2006.01) | |
| B60K 25/00 | (2006.01) | |
| B60W 20/00 | (2016.01) | |
| F02N 11/04 | (2006.01) | |

(52) U.S. Cl.
CPC .......... *B60W 10/06* (2013.01); *B60W 10/08* (2013.01); B60K 2025/005 (2013.01); *B60L 2240/423* (2013.01); *B60W 20/00* (2013.01); *B60W 2510/087* (2013.01); *B60W 2510/244* (2013.01); *B60W 2710/08* (2013.01); *B60Y 2200/92* (2013.01); *B62D 65/10* (2013.01); *F02N 11/04* (2013.01)

(58) Field of Classification Search
CPC .. B60K 2006/4825; B60K 6/48; B60K 6/105; F16D 25/0638; B60W 20/10; B60W 10/06; B60W 10/08; B60W 20/00; B60W 2510/087; B60W 2510/244; B60W 2710/08; B60W 20/19; B60W 2540/12; B60W 2710/083; B60W 10/26; B60W 50/082; B60L 2240/4223; B60Y 2200/92; B62D 65/10; F02N 11/04
See application file for complete search history.

(56) References Cited

U.S. PATENT DOCUMENTS

| | | | | |
|---|---|---|---|---|
| 6,116,364 | A | 9/2000 | Taguchi | B60L 50/40 180/65.26 |
| 6,133,659 | A | 10/2000 | Rao | H02K 7/006 310/89 |
| 6,202,776 | B1 | 3/2001 | Masberg | F02N 11/818 180/65.22 |
| 6,367,570 | B1 | 4/2002 | Long, III | B60W 10/08 60/705 |
| 6,490,914 | B1 | 12/2002 | Brandenburg | F02N 15/006 73/114.26 |
| 6,531,799 | B1 | 3/2003 | Miller | H02K 21/046 310/156.43 |
| 6,561,336 | B1 | 5/2003 | Huart | B60K 6/26 192/70.252 |
| 6,648,086 | B1 | 11/2003 | Schulte | B60K 6/40 475/5 |
| 6,740,002 | B1 | 5/2004 | Stridsberg | B60W 10/08 477/14 |
| 6,935,450 | B1 | 8/2005 | Tsuzuki | H02K 7/006 180/65.26 |
| 6,936,933 | B2 | 8/2005 | Wilmore | B60K 6/383 290/46 |
| 6,938,713 | B1 | 9/2005 | Tahara | B60W 10/06 180/65.26 |
| 7,647,994 | B1 | 1/2010 | Belloso | B60K 6/485 180/69.6 |
| 8,423,214 | B2* | 4/2013 | Kshatriya | B60K 6/485 180/65.21 |
| 9,358,866 | B2 | 6/2016 | Hartz et al. | |
| 2001/0040061 | A1 | 11/2001 | Matuda | H01M 10/615 180/68.2 |
| 2003/0024749 | A1 | 2/2003 | Kobayashi | B60K 6/485 180/65.21 |
| 2004/0104630 | A1 | 6/2004 | Denner | B60L 50/16 310/75 R |
| 2006/0000650 | A1 | 1/2006 | Hughey | B60L 7/12 180/65.25 |
| 2006/0030450 | A1* | 2/2006 | Kyle | B60K 6/26 477/3 |
| 2006/0283642 | A1 | 12/2006 | Hickam | B60K 63/36 180/65.1 |
| 2007/0161455 | A1 | 7/2007 | King | B60L 3/0046 477/3 |
| 2007/0163819 | A1* | 7/2007 | Richter | B60L 3/0038 180/65.245 |
| 2007/0284164 | A1 | 12/2007 | Hamstra | B60W 10/06 180/65.265 |
| 2010/0044129 | A1 | 2/2010 | Kyle | B60L 50/16 |
| 2011/0000721 | A1 | 1/2011 | Hassett | B60L 15/2009 180/65.21 |
| 2011/0083309 | A1* | 4/2011 | Kshatriya | B60W 20/00 903/903 |
| 2011/0083918 | A1* | 4/2011 | Kshatriya | B60W 10/06 903/903 |
| 2011/0083919 | A1* | 4/2011 | Kshatriya | B60W 20/15 903/903 |
| 2011/0087390 | A1* | 4/2011 | Pandit | B60W 20/14 903/903 |
| 2011/0087391 | A1* | 4/2011 | Pandit | B60W 50/0097 903/903 |
| 2011/0115225 | A1 | 5/2011 | Gruenberger | F02N 15/006 290/46 |
| 2011/0246005 | A1 | 10/2011 | King | B60W 10/11 701/22 |
| 2012/0258838 | A1 | 10/2012 | Hartz | B60W 20/00 477/5 |
| 2012/0329603 | A1 | 12/2012 | Yamazaki | B60W 20/10 477/3 |
| 2013/0091694 | A1 | 4/2013 | Hussain | B60W 10/26 29/593 |
| 2013/0184916 | A1 | 7/2013 | Goodwin | B60W 20/00 903/903 |
| 2014/0171260 | A1 | 6/2014 | Dalum | B60W 10/06 903/906 |
| 2017/0029054 | A1 | 2/2017 | Woodward et al. | B62D 65/04 |
| 2017/0260894 | A1 | 9/2017 | Auerbach | F01P 3/20 |
| 2017/0297414 | A1 | 10/2017 | Beloe | B60H 1/323 |
| 2018/0009309 | A1 | 1/2018 | Maringer | B60W 10/08 |
| 2018/0163607 | A1 | 6/2018 | Uto | F02B 29/0443 |
| 2018/0362017 | A1 | 12/2018 | Meyer | B60W 10/06 |
| 2020/0062238 | A1 | 2/2020 | Hawley | B60W 10/08 |
| 2020/0094810 | A1 | 3/2020 | Moreland | B60W 10/06 |

FOREIGN PATENT DOCUMENTS

| | | |
|---|---|---|
| WO | WO 0031411 A1 | 6/2000 |
| WO | WO-2012034031 A2 | 3/2012 |
| WO | WO 2014155263 A1 | 10/2014 |
| WO | WO 2015166258 A1 | 11/2015 |
| WO | WO 2019138731 A1 | 7/2019 |

OTHER PUBLICATIONS

Miller, John H., et al., "Electric Drive Subsystem for a Low-Storage Requirement Hybrid Electric Vehicle," IEEE Transactions on Vehicular Technology, vol. 48 No. 6, Nov. 1999, pp. 1788 to 1796 (Yr: 1999).

Volve press release, "Integrated Starter Generator (ISG)", Nov. 11, 2001, 9 pages with related images, downloaded from: http://www.media.volvocars.com/global/en-GB/media/pressreleases/5278 (Yr: 2001).

Walker, A. et al., "System Consideration for an Automotive Integrated Starter Generator", Second International Machines and Drives (PEMD 2004), Mar. 31-Apr. 2, 2004, pp. 62-66 (Yr: 2004).

Crescimbini, Fabio et al., "Compact permanent-magnet generator for hybrid vehicle applications", IEEE Transactions on Industry

(56) References Cited

OTHER PUBLICATIONS

Applications, vol. 41 No. 5, Sep./Oct. 2005, pp. 1168 to 1177 (Year: 2005).
Jackson, Tom, "The Cummins CorePius motor-generator provides hybrid-like benefits and could be retrofitted on trucks and equipment", Equipment World, Mar. 7, 2014, 3 pages (Year: 2014).
LuK, "Dual Mass Flywheel" brochure (Technology/Failure Diagnosis/Testing tool/User Instructions), Docuent 999 6002 310/02.2016 (c) 2016 Schaeffler Automotive Aftermarket GmbH & Co. KG, 48 pages (Year: 2016).

* cited by examiner

VEHICLE WITH REAR INTERNAL COMBUSTION ENGINE
(BEFORE RETROFIT)

ELECTRIC MOTOR DRIVE RETROFIT SYSTEM

MGU AND SUPPLEMENTAL FLYWHEEL BETWEEN MOTOR AND CLUTCH
(AFTER RETROFIT)

INTERNAL COMBUSTION ENGINE AND TRANSMISSION OF VEHICLE
(BEFORE RETROFIT)

FLYWHEEL AND STARTER UNIT REMOVED
(DURING RETROFIT)

MGU, SUPPLEMENTAL FLYWHEEL, AND MCU INSTALLED
(DURING RETROFIT)

HYBRID POWERTRAIN
(AFTER RETROFIT)

RETROFIT HYBRIDIZATION SYSTEM

HYBRID POWERTRAIN WITH POWER AND COOLING LINES
(AFTER RETROFIT)

MGU AND SUPPLEMENTAL FLYWHEEL

PERSPECTIVE VIEW OF ICE COUPLING SIDE OF MGU

CROSS-SECTIONAL VIEW OF MGU AND SUPPLEMENTAL FLYWHEEL
INSTALLED BETWEEN TRANSMISSION AND ENGINE

MGU BETWEEN ICE AND CLUTCH
(AFTER RETROFIT – ANOTHER EMBODIMENT)

MGU BETWEEN CLUTCH AND TRANSMISSION INPUT
(AFTER RETROFIT – ANOTHER EMBODIMENT)

TORQUE SUPPLY OPERATING MODE
(FIRST OPERATING MODE - MGU ADDS TORQUE TO POWERTRAIN)

TORQUE REMOVING OPERATING MODE
(SECOND OPERATING MODE - MGU REMOVES
TORQUE FROM POWERTRAIN)

CONTROL TECHNIQUES FOR CONTROLLING ELECTRIC HYBRID RETROFITTED VEHICLES

CROSS REFERENCE TO RELATED APPLICATIONS

This application claims the benefit under 35 U.S.C. § 119 from U.S. Provisional Patent Application Ser. No. 62/736,920, entitled "Hybrid System For Vehicles," filed on Sep. 26, 2018, the subject matter of which is incorporated herein by reference.

TECHNICAL FIELD

The described embodiments relate to electric vehicles, and more particularly to retrofitting combustion engine vehicles to hybrid form.

BACKGROUND INFORMATION

Vehicle manufacturers sell and provide vehicles of varying caliber, performance, and efficiency. Some vehicles have different performance or efficiency characteristics than others. Consumers often desire additional modifications to further increase the performance or efficiency of their vehicles. Aftermarket modifications that improve overall vehicle performance or efficiency are desirable.

SUMMARY

An electric motor drive retrofit system (EMDRS) comprises a power system, an energy storage system (ESS), a cooling system, a vehicle control unit (VCU), and a user interface device (UID). A combustion engine drive vehicle with tight space constraints is retrofittable with the EMDRS to provide hybrid drive functionality. The EMDRS is retrofittable into any vehicle configuration, including front-engine, mid-engine, rear-engine, transverse engine, rear-wheel drive, front-wheel drive, two-wheel drive, four-wheel drive, manual transmission, automatic transmission, dual-clutch transmission, and constant velocity transmission configurations. The EMDRS provides broad vehicle applicability because most vehicle powertrains have an engine connected to a transmission regardless of powertrain layout.

The EMDRS includes a motor generator unit (MGU) coupled to a motor control unit (MCU). The MCU transfers charge between the MGU and ESS. The MGU has a transmission coupling side and an internal combustion engine (ICE) coupling side. During retrofit, the MGU is coupled between a transmission and ICE of the vehicle. The MGU couples torque to the crankshaft of the ICE and transmission input shaft through screws, spline coupling, or similar torque transfer interfacing. The MGU remains mechanically engaged and coupled to the ICE throughout operation of the EMDRS. The MGU has a rotor having a first side and a second side. The rotor remains coupled to the crankshaft during operation of the ICE. The MGU is not disconnected or disconnect-able from the crankshaft ICE. The rotor is clutchlessly connected to the crankshaft. After coupling the MGU to the ICE, the first side of the rotor is directly coupled to the crankshaft of the ICE without any intervening clutch. The term "clutch" will be understood to include a conventional pressure plate and disc as used in traditional manual transmission arrangements as well as other mechanisms that can decouple an ICE from the powertrain, such as torque converters or clutches internal to the transmission.

In one embodiment, space to accommodate the MGU is created by separating the ICE and transmission and optionally removing the flywheel. The MGU has a short length to facilitate fitment within limited space constraints. The MGU has a high torque to length ratio thereby adding significant torque to the powertrain despite having a short length. In one example, the MGU is an axial flux motor and has a torque to length ratio that is greater than 1.5 newton-meters per millimeter. In another example, the MGU has a torque to length ratio that is greater than 2.0 newton-meters per millimeter. In yet another example, the MGU has a torque to length ratio that is greater than 2.5 newton-meters per millimeter. The MGU is shaped such that at least part of the MGU fits within the transmission bell housing and uses the existing mounting interface between the ICE and transmission. The MGU mounts directly or indirectly to the ICE and transmission interface. The MGU has a rotor diameter and an MGU length. In one example, the rotor diameter is at least two times the MGU length. In another example, the rotor diameter is at least three times the MGU length. In yet another example, the rotor diameter is at least four times the MGU length.

In one embodiment, the cooling system is a liquid cooling system that supports high power density such that each component of EMDRS can be of compact size or light weight, and for ease of retrofitting. In one example, the cooling system uses a Freon based cooling fluid that provides sub-ambient coolant temperatures. In another embodiment, the cooling system uses air cooling or a combination of various cooling mediums for various system elements.

A common design challenge in retrofitting vehicles is finding space for retrofit components. Powertrains of vehicles are particularly tight and constrained and provide very little, if any, space for inclusion of new retrofit parts. Even more challenging is fitting in hybrid drive components, such as the MGU, into a powertrain that was specifically unintended for hybrid drive and intentionally designed for combustion engine drive. Applicant has recognized a remarkably adaptable technique for retrofitting any chassis topology. The MGU is retrofittable into any existing powertrain topology by creating a gap or separation between the engine and the transmission thereby providing space for retrofit components. The gap or separation formed between the engine and transmission is minimized so that the gap or separation will not be prohibitive and will not affect vehicle operation. This space is minimized by several novel retrofit components, including: using an axial flux topology for the MGU; using a rotor in the MGU that does not have any bearings and is directly coupled to the crankshaft; using liquid cooling allowing for high power density components; using high storage capacity ESS topologies; allowing control of EMDRS via an existing mobile phone or wireless device; and replacing existing vehicle components with more compact components that mimic functionality of the replaced components, such as replacing the clutch with a more compact clutch and replacing the flywheel with the MGU and supplemental flywheel.

After retrofit, the gap or separation between the ICE and transmission due to the added MGU does not exceed ten inches. In another example, the gap is less than five inches. In another example, the gap is less than two inches. Other parts of the EMDRS fit in existing vehicle cavities. For example, the ESS can fit in the existing trunk space of the vehicle. In the case where the starter unit is removed during retrofit, the MGU is used as a starter motor. In one embodiment, the space originally occupied by the starter is used to pass power, cabling, and cooling lines to the MGU. The original 12V battery is no longer required to deliver power adequate to start the ICE which facilitates replacement with a smaller and lighter 12V battery. Removal of the original starter thus provides offsetting weight savings. Accordingly, the EMDRS provides hybrid retrofit capabilities to vehicles originally designed as non-hybrid and without space allowances for hybrid equipment with extremely tight space constraints. In other embodiments where space is abundant or not a design constraint, the separation or gap can exceed the gap or separation distances set forth above.

In one embodiment, the flywheel and starter unit of the vehicle, as provided by the manufacturer, are removed. The MGU and supplemental flywheel are installed between the transmission and ICE such that the supplemental flywheel and MGU are sandwiched between a clutch and the ICE. The MGU has an internal rotor within an MGU housing. The ICE coupling side of the rotor is coupled to a crankshaft of the ICE. The connection between the ICE coupling side of the rotor and the crankshaft is clutchless such that the rotor always remains connected to the crankshaft. There are no intervening parts that permit disengagement between the rotor and the crankshaft. The transmission coupling side of the rotor is coupled to the transmission. The transmission coupling side couples directly to a transmission input or couples to the transmission input via a clutch. Whether or not the transmission coupling side couples to the transmission through a clutch depends on the vehicle type and design objectives. After retrofit, the supplemental flywheel and part of the MGU are disposed within the transmission bell housing. Part of the MGU may be exposed and outside of the bell housing.

The VCU controls starting of the ICE by signaling the MCU and MGU to create a starting torque. This starting torque generated by the MGU mimics a function of the starter motor that was removed during retrofit. The VCU collects information about the state of components of the EMDRS and also monitors state of the vehicle, vehicle operator inputs, the ICE, and the transmission. Monitoring is performed by listening to the vehicle CAN bus or by using digital or analog inputs connected to an instrumented vehicle.

In embodiments where the original flywheel is removed, the MGU rotor is used to partially or fully replace the lost inertial mass of the removed flywheel. A supplemental flywheel is optionally provided that has a size, shape, and position favorable to fitting of the MGU. Features are added to the supplemental flywheel or MGU to provide crank position sensor functionality formerly provided by the flywheel. The supplemental flywheel is an important part of the EMDRS because several functions of the removed original flywheel need to be reproduced for the vehicle to operate. These include providing enough rotational inertia for smooth ICE operation, mounting the clutch assembly and transferring torque to it (for manual transmissions), transferring torque directly to the transmission input (for automatic transmissions), having gear teeth around the perimeter that engage the engine starter, and having timing teeth so that a crankshaft position sensor (CPS) can determine the rotational position and speed of the crankshaft. The supplemental flywheel adds its rotational inertia to rotor of MGU to provide sufficient combined inertia for smooth ICE operation. The supplemental flywheel includes clutch mounting or transmission input shaft features as appropriate, and CPS timing teeth.

The VCU controls the EMDRS in a first operating and in a second operating mode. In a first operating mode, the EMDRS adds torque to the powertrain before the transmission input stage and after the crankshaft output. During the first operating mode, the MCU controls the MGU to supply torque to the powertrain of the vehicle thereby discharging the ESS. The first operating mode is also referred to as a torque supplying mode. In the second operating mode, the EMDRS removes torque from the powertrain of the vehicle. During the second operating mode, the MCU controls the MGU to remove mechanical torque from the powertrain thereby charging the ESS. The second operating mode is also referred to as a regenerative braking mode.

In one embodiment, the VCU does not interfere with any pre-existing vehicle electronics. The EMDRS does not require any pre-authorization, handshake, or registration with existing vehicle system electronics or sensors. The EMDRS listens to vehicle sensor outputs via digital or analog signal lines or CAN bus. No part of the EMDRS communicates signals to vehicle system electronics or sensors. Vehicle electronics provided by the manufacturer are effectively unaware of the presence of EMDRS during vehicle operation. The EMDRS is installable in both automatic and manual transmission configurations.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some exemplary embodiments of the invention, examples of which are illustrated in the accompanying drawings.

Figure 1:
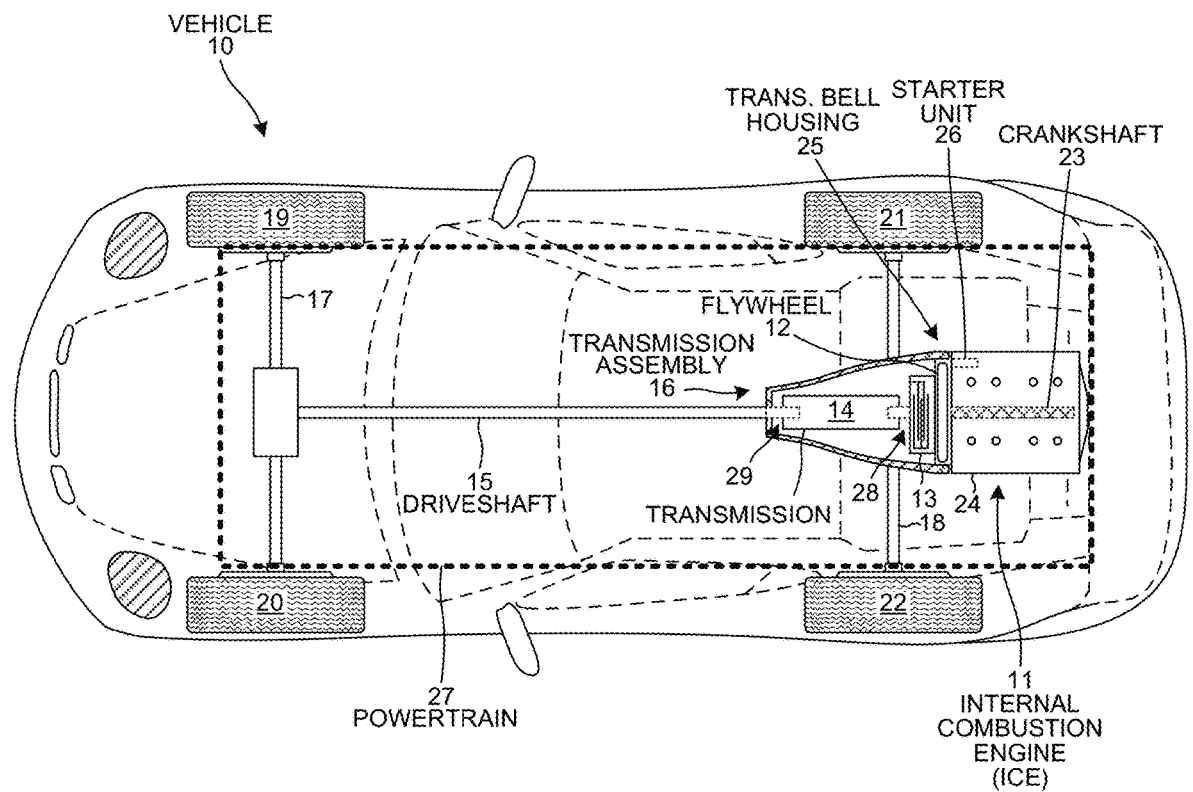
FIG. 1 is a diagram of a vehicle 10 before retrofitting with an electric motor drive retrofit system 100.

FIG. 1 is a diagram of a vehicle 10 before retrofitting with an electric motor drive retrofit system 100. The vehicle 10 comprises an internal combustion engine (ICE) 11, a flywheel 12, a clutch 13, a transmission 14, a driveshaft 15, axles 17 and 18, and wheels 19-22. ICE 11 includes a crankshaft 23 disposed within an engine casing 24. Transmission assembly 16 includes the transmission 14, clutch 13, and flywheel 12 disposed within a transmission case. A starter unit 26 turns on ICE 11. It is appreciated that vehicle 10 includes many more details that are intentionally omitted.

Flywheel 12, clutch 13, transmission 14, driveshaft 15, differential 16, and axles 17 and 18 form part of powertrain 27 of vehicle 10. ICE 11 converts fuel into mechanical energy in the form of torque. This torque is supplied within the powertrain 27 which in turn rotates the wheels 19-22 thereby causing vehicle 10 to move. Transmission 14 has an input 28 and possible outputs 17, 18, and 29. Input 28 of transmission 14 is coupled to clutch 13. Output 29 of transmission 14 is coupled to driveshaft 15. In operation, transmission 14 is controlled to transfer torque from ICE 11, through clutch 13, and onto driveshaft 15 and/or axles 17 and 18.

Figure 2:
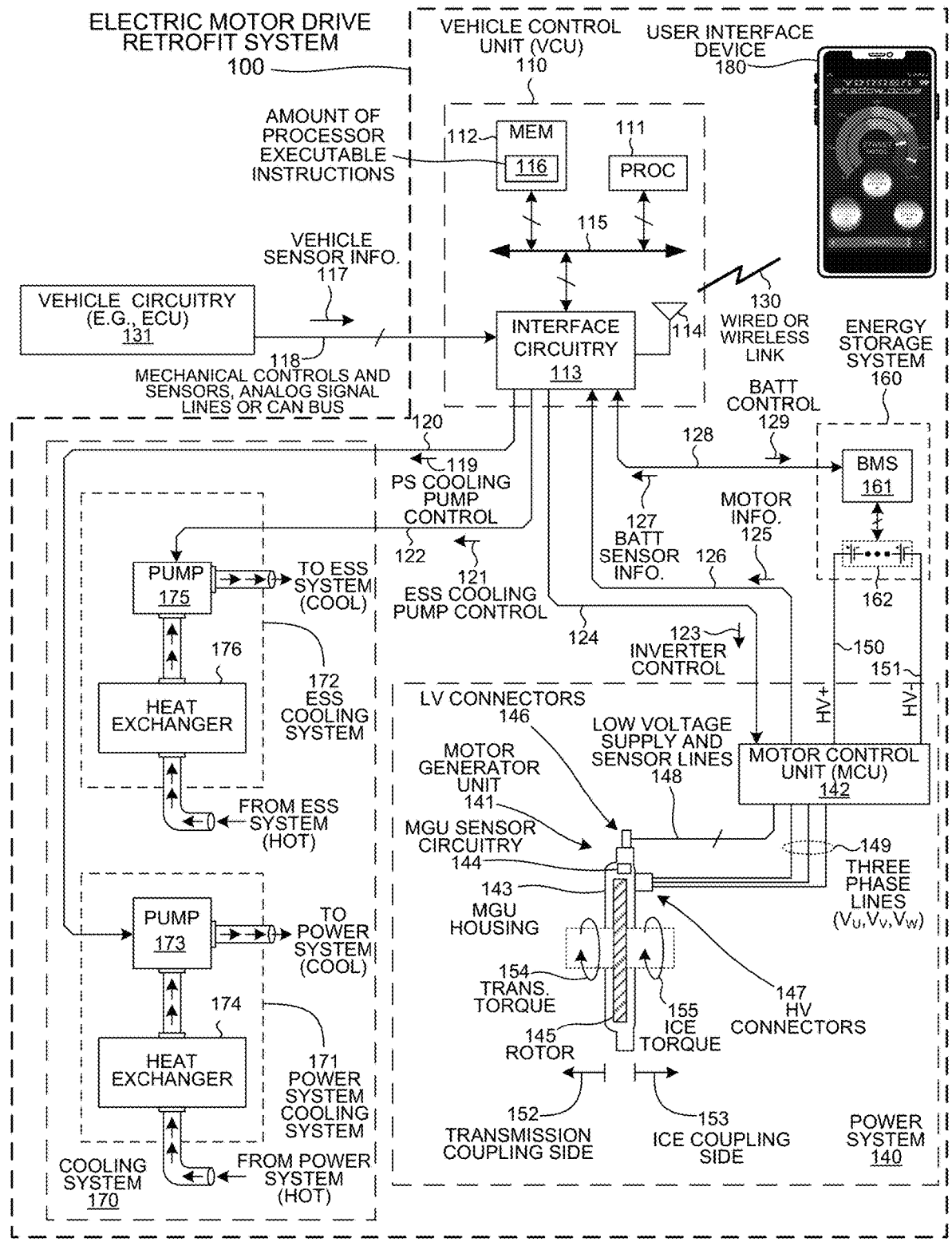
FIG. 2 is a diagram of an electric motor drive retrofit system (EMDRS) 100.

FIG. 2 is a diagram of an electric motor drive retrofit system (EMDRS) 100. EMDRS 100 is also referred to as a "hybrid retrofit system". As explained in detail below, vehicle 10 is retrofittable with EMDRS 100. EMDRS 100 is retrofittable into any vehicle configuration, including front-engine, mid-engine, rear-engine, transverse engine, rear-wheel drive, front-wheel drive, two-wheel drive, four-wheel drive, manual transmission, automatic transmission, dual-clutch transmission, and constant velocity transmission configurations.

In one novel aspect, EMDRS 100 provides broad vehicle applicability because most vehicle powertrains have an engine connected to a transmission regardless of powertrain layout. Space between the engine and transmission to accommodate fitment of the motor generator unit is created by some combination of flywheel removal or replacement, separation between engine and transmission, or replacement of the clutch with a more compact alternative clutch. After retrofitting with EMDRS 100, powertrain 27 of vehicle 10 is a hybrid electric and fuel driven powertrain 27. The resulting powertrain retrofitted with EMDRS 100 is supplied by torque from an electrical motor of EMDRS 100 in addition to torque supplied by ICE 11. EMDRS 100 comprises a vehicle control unit 110, a power system 140, an energy store system (ESS) 160, a cooling system 170, and a user interface device 180.

VCU 110 controls operation of the EMDRS 100. VCU 110 comprises a processor 111, memory 112, interface circuitry 113, antenna 114, and local bus 115. Memory 112 stores an amount of processor-executable instructions 116. Processor 111 reads instructions 116 from memory 112 over local bus 115. Processor 111 reads information received onto interface circuitry 113 over local bus 115 and supplies control signals to interface circuitry 113 via local bus 115.

Interface circuitry 113 receives vehicle sensor information 117 from vehicle circuitry 131 via link 118. Link 118 is digital or analog signal lines or a CAN (Controller Area Network) bus or similar depending on vehicle type. Vehicle circuitry 131 is not part of EMDRS 100, except when they needed to be added as part of the retrofit. Vehicle circuitry 131 is typically provided along with vehicle 10 from a vehicle supplying entity. Vehicle circuitry 131 includes an engine control unit, transmission control unit, and any other circuitry within vehicle 10 that supplies vehicle sensor information.

In accordance with at least one novel aspect, EMDRS 100 may operate without notifying, interrupting, or otherwise interfering with operation of vehicle circuitry 131. After retrofit, vehicle circuitry 131 is unaware of the presence of EMDRS 100. In one embodiment, EMDRS 100 does not send any communication back to vehicle circuitry 131. EMDRS 100 does not require any prior registration or permission from vehicle circuitry 131 to operate in accordance with the present disclosure. No handshake between EMDRS 100 and vehicle circuitry 131 is involved during the retrofit process. After retrofitting vehicle 10 with EMDRS 100, communication between EMDRS 100 and vehicle circuitry 131 is unidirectional in that VCU 110 of EMDRS 100 only receives information from vehicle circuitry 131. In other embodiments, EMDRS 100 engages in bidirectional communication with vehicle circuitry 131 and information is passed back and forth between VCU 110 and vehicle circuitry 131.

VCU 110 controls the cooling system 170 by causing interface circuitry 113 to supply a power system cooling pump control signal 119 via communication link 120 and an ESS cooling pump control signal 121 via communication link 122. In other embodiments, relays are used to switch pump circuitry on and off. VCU 110 controls power system 140 by causing interface circuitry 113 to supply an MCU control signal 123 via communication link 124. VCU 110 receives motor information 125 onto interface circuitry 113 via communication link 126. VCU 110 receives battery sensor information 127 onto interface circuitry 113 via communication link 128. VCU 110 controls ESS 160 by causing interface circuitry 113 to supply a battery control signal 129 via communication link 128. VCU 110 communicates with user interface device 180 via wireless or wired connection. In this example, VCU 110 communicates wirelessly with user interface device 180 via wireless link 130. The user interface device 180 presents performance information to an operator of vehicle 10. An operator of vehicle 10 sets a selected operating mode of the EMDRS 100 through the user interface device 180. In other embodiments, an internal Controller Area Network (CAN bus) provides communication between the various components of EMDRS 100.

Power system 140 comprises a motor generator unit (MGU) 141 and a Motor Control Unit (MCU) 142. MGU 141 comprises a housing 143, MGU sensor circuitry 144, rotor 145, low voltage connectors 146, and high voltage connectors 147. MCU 142 supplies low voltage signals to MGU 141 and reads MGU sensor information via lines 148. Three-phase or DC power lines 149 couple between MGU 141 and MCU 142. MCU 142 couples to ESS 160 via a positive high voltage DC+ link 150 and a negative high voltage DC- link 151. In this specific embodiment, the MCU 142 is an inverter.

In accordance with another novel aspect, MGU 141 has a transmission coupling side 152 and an ICE coupling side 153. During retrofitting of EMDRS 100, MGU 141 is fit between transmission 14 and ICE 11. Reference numeral 154 identifies transmission torque transferred between MGU 141 and transmission 14. Reference numeral 155 identifies engine torque transferred between MGU 141 and ICE 11.

MGU 141 is operable in a torque-supplying operating mode and a torque-removing operating mode. In the torque-supplying operating mode, MGU 141 is controlled to supply transmission torque 154 onto powertrain 27 of vehicle 10. During the torque-supplying operating mode, MCU 142 receives DC power from DC+ link 150 and DC- link 151, and the MCU 142 generates and supplies three-phase power to MGU 141 via lines 149. This transmission torque 154 is added before transmission 14. By supplying torque before transmission 14, EMDRS 100 takes advantage of existing gear reduction in the transmission 14 to deliver performance enhancement in every gear.

Figure 4:
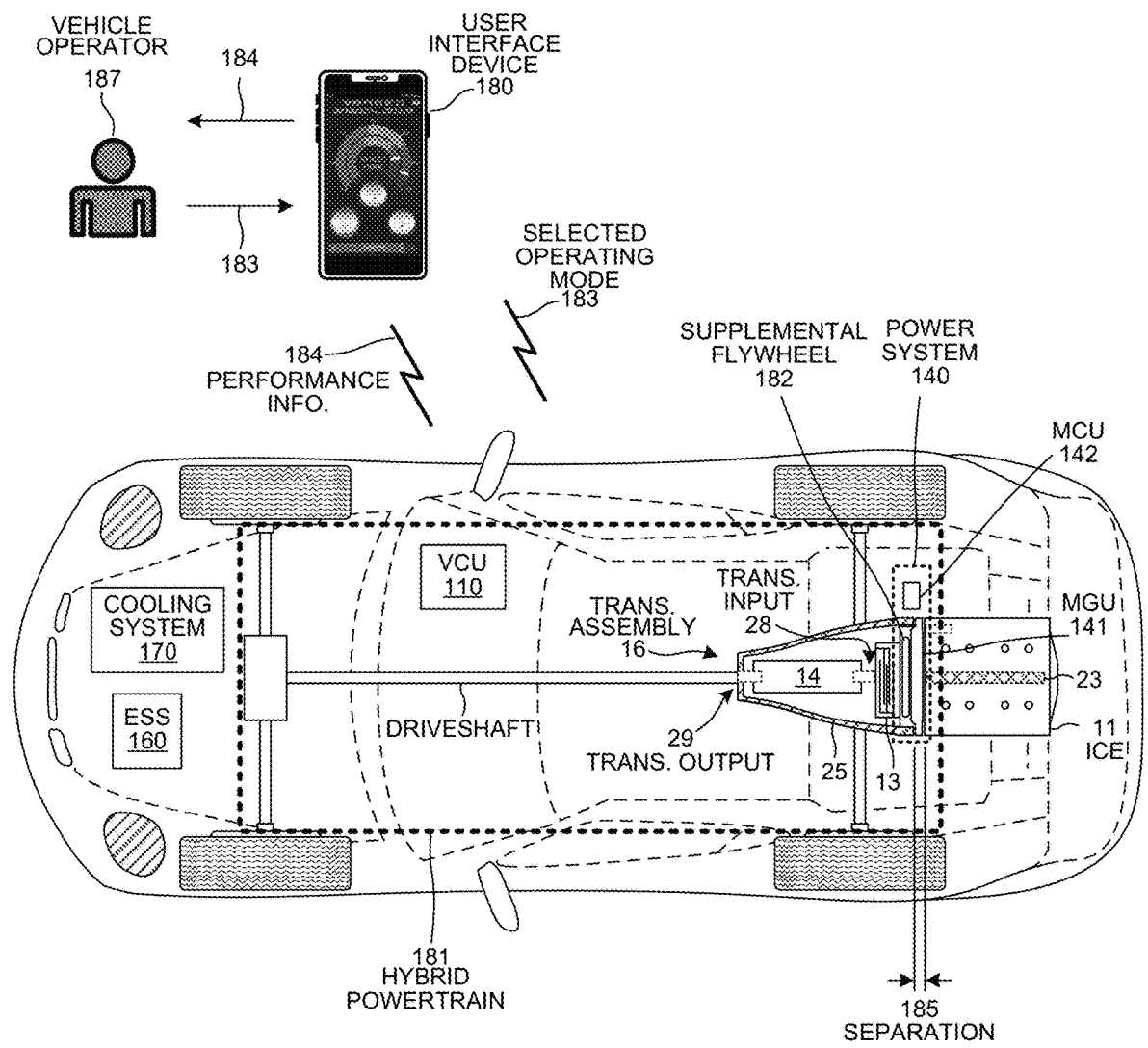
FIG. 4 is a high-level diagram showing vehicle 10 after being retrofitted to include EMDRS 100.

In one embodiment, the MGU 141 is placed between the ICE 11 and the clutch 13 as in FIG. 4. This embodiment allows generation of power in torque removal mode whenever the ICE is operating, even if the vehicle is stationary. This embodiment also allows for rev-matching of the ICE 11 and transmission 14 to smooth shifting operations. In another embodiment, the MGU 11 is placed between the transmission and clutch, which enables an electric vehicle drive mode without the need of ICE 11 operation to move the vehicle 10.

In the torque-removing operating mode, MGU 141 is controlled to remove torque from powertrain 27 of vehicle 10. During the torque-removing operating mode, rotation of rotor 145 generates AC power supplied to MCU 142 via lines 149. MCU 142 receives this AC power, and MCU 142 generates and outputs DC power used to charge ESS 160. MGU 141 converts mechanical energy in the form of torque from powertrain 27 into electrical energy that is used to charge ESS 160. The torque-removing operating mode is also referred to as a "regenerative braking operating mode" because torque on the powertrain 27 is reduced in this mode, causing vehicle 10 to slow down or creating a load on the ICE 11.

ESS 160 comprises a battery management system 161 and energy storage device 162. ESS 160 is often referred to as a "battery pack". The energy storage device 162 may be one or a combination of different energy storage technologies including batteries, capacitors, flywheel storage, hydro pneumatic and others. BMS 161 controls charge and discharge of energy storage device 162. BMS 161 also monitors and senses various battery cell characteristics, including state of health (SOH), state of charge (SOC), temperature information, voltage information, and current information. In the torque-supplying operating mode, energy storage device 162 is discharged. In the torque-removing operating mode, energy storage device 162 is charged.

In one embodiment, cooling system 170 includes power system cooling system 171 and an ESS cooling system 172. Alternate embodiments use a single cooling system, or combine with the existing ICE cooling system. Power system cooling system 171 includes a pump 173 and a heat exchanger 174. ESS cooling system 172 includes a pump 175 and a heat exchanger 176. In this example, heat exchangers 174 and 176 are radiators that flow air through cooling vents that provide a mechanism to transfer heat with the coolant. Power system cooling system 171 forms a first cooling loop that cools MGU 141 and MCU 142 of power system 140 during operation. Cooling lines (not shown) extend and flow coolant through MGU 141 and MCU 142. ESS cooling system 172 forms a second cooling loop that cools ESS 160 during operation. Cooling lines (not shown) extend and flow coolant through energy storage device 162. In other embodiments, Freon, sub-ambient cooling mediums, air cooling, or a combination of different cooling mediums are used.

Figure 3:
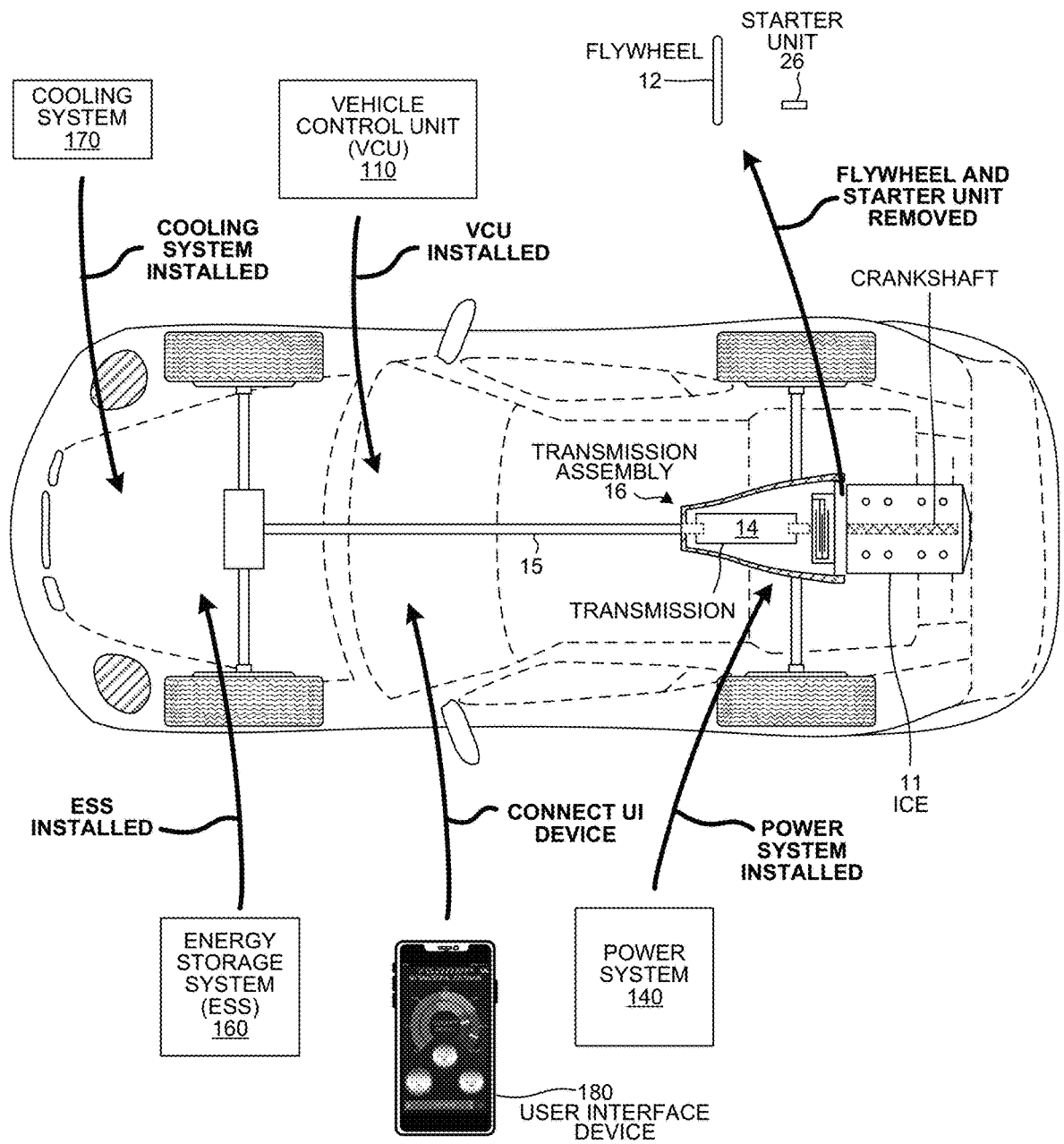
FIG. 3 is a high-level diagram showing how vehicle 10 is retrofitted to include EMDRS 100.

FIG. 3 is a high-level diagram showing how vehicle 10 is retrofitted to include EMDRS 100. In this embodiment of a retrofitting process, flywheel 12 and starter unit 26 of vehicle 10 are removed. Power system 140 is installed by coupling MGU 141 between ICE 11 and transmission 14. A supplemental flywheel 182 (FIG. 4) is also added between clutch 13 and MGU 141. ESS 160 is installed in vehicle 10 and coupled to MCU 142. Cooling system 170 is installed in the vehicle 10 and cooling loops are connected to ESS 160 and power system 140. VCU 110 is installed in vehicle 10 and coupled to the power system 140, ESS 160, cooling system 170, and vehicle comm. link or to added sensors to receive vehicle sensor information. User interface device 180 is connected to VCU 100 to control EMDRS 100 and to receive performance information.

FIG. 4 is a high-level diagram showing vehicle 10 after being retrofitted to include EMDRS 100. Hybrid powertrain system 181 includes EMDRS 100. During operation, torque is supplied onto hybrid powertrain 181 from both MGU 141 and ICE 11. Vehicle operator 187 selects an operating mode through user interface device 180. User interface device 180 communicates the selected operating mode 183 to VCU 110. VCU 110 configures and controls EMDRS 100 in accordance with the selected operating mode 183. User interface device 180 receives performance information 184 from the VCU 110 which is then presented to the vehicle operator.

EMDRS 100 supports logging and statistical data gathering functionality, review of collected data, monitoring system status and performance, updating software, and uploading and downloading support information. EMDRS 100 supports wired and wireless connections to smart phones, tablets, and other network connected devices. In one embodiment, performance information 184 and operating mode selection information is communicated to a storage and data analysis system. The storage and data analysis system analyzes and provides usage and performance metrics to vehicle operator 187 and optionally to other entities, such as social media systems. The storage and data analysis system optionally provides the performance and analysis information to other entities desiring feedback on EMDRS 100.

A separation 185 between transmission bell housing 25 and ICE 11 may remain after the retrofit process. In one embodiment, the separation 185 is less than ten inches. In another embodiment, the separation 185 is less than five inches. In another embodiment, the separation 185 is less than two inches. In embodiments without tight powertrain space constraints, the separation 185 is not considered a significant constraint and is larger than the distances set forth above.

Figure 5:
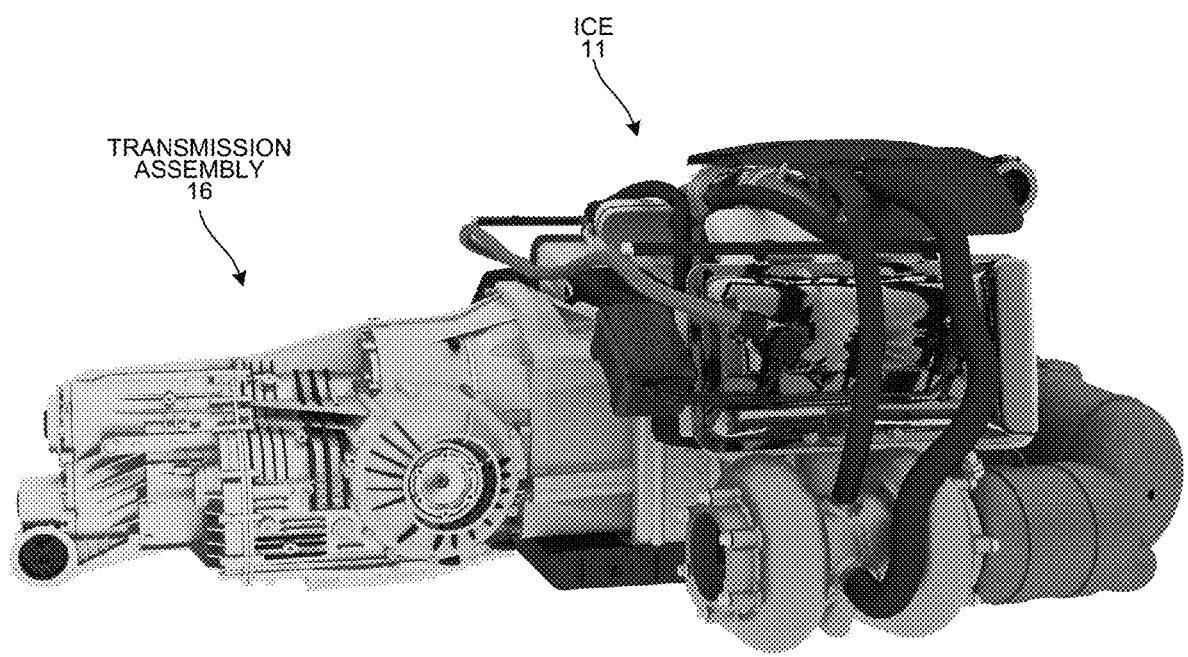
FIG. 5 is a perspective diagram showing a view of internal combustion engine 11 and transmission assembly 16 of vehicle 10 before retrofit of the vehicle 10.

FIG. 5 is a perspective diagram showing a view of internal combustion engine 11 and transmission assembly 16 of vehicle 10 before retrofit of the vehicle 10. The transmission assembly 16 shown in FIG. 5 includes the transmission bell housing 25, flywheel 12, clutch 13, and transmission 14 in addition to other details not shown in FIG. 1.

Figure 6:
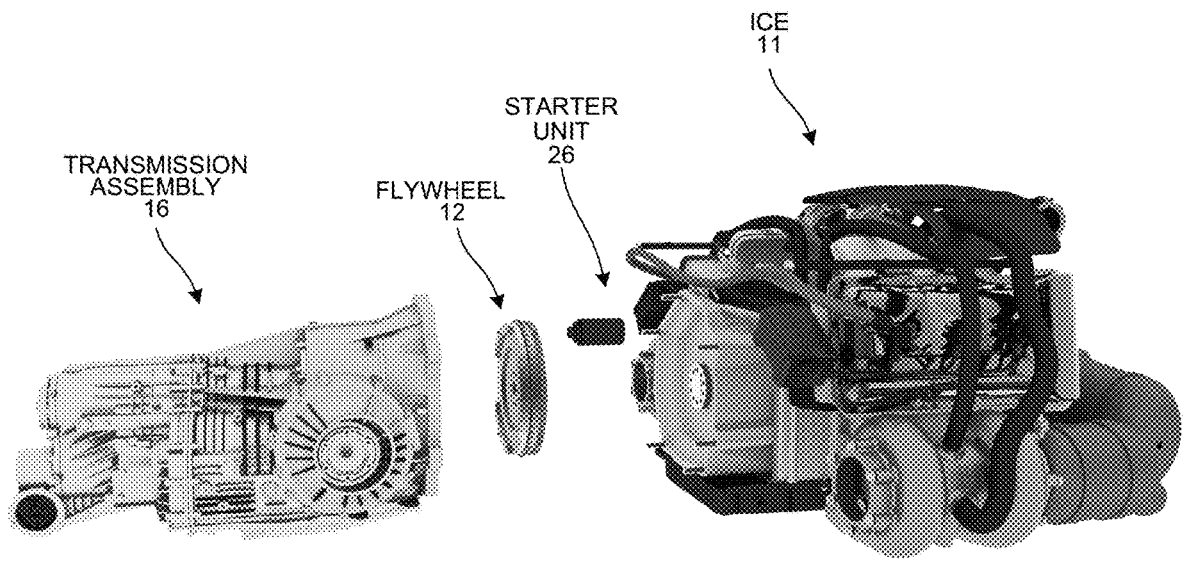
FIG. 6 is a perspective diagram showing an exploded view of removal of the flywheel 12 and starter unit 26.

FIG. 6 is a perspective diagram showing an exploded view of removal of the flywheel 12 and starter unit 26. Flywheel 12 is decoupled from ICE 11 and is removed from transmission bell housing 25. Starter unit 26 is removed from ICE 11.

Figure 7:
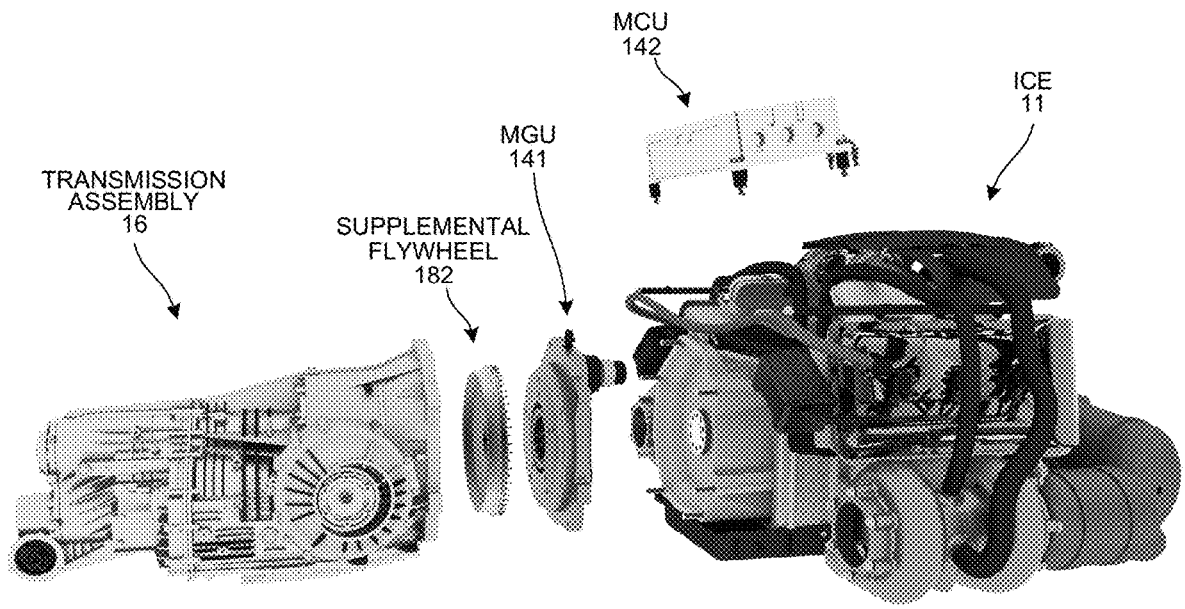
FIG. 7 is a perspective diagram showing an exploded view of how the power system 140 is installed.

FIG. 7 is a perspective diagram showing an exploded view of how the power system 140 is installed. MCU 142 is attached in a convenient location. MGU 141 is coupled between ICE 11 and transmission 14. The supplemental flywheel 182 is bolted to the rotor of the MGU 141 and to the crankshaft 23. In alternate embodiments, the supplemental flywheel 182 is coupled between MGU 141 and ICE 11.

Figure 8:
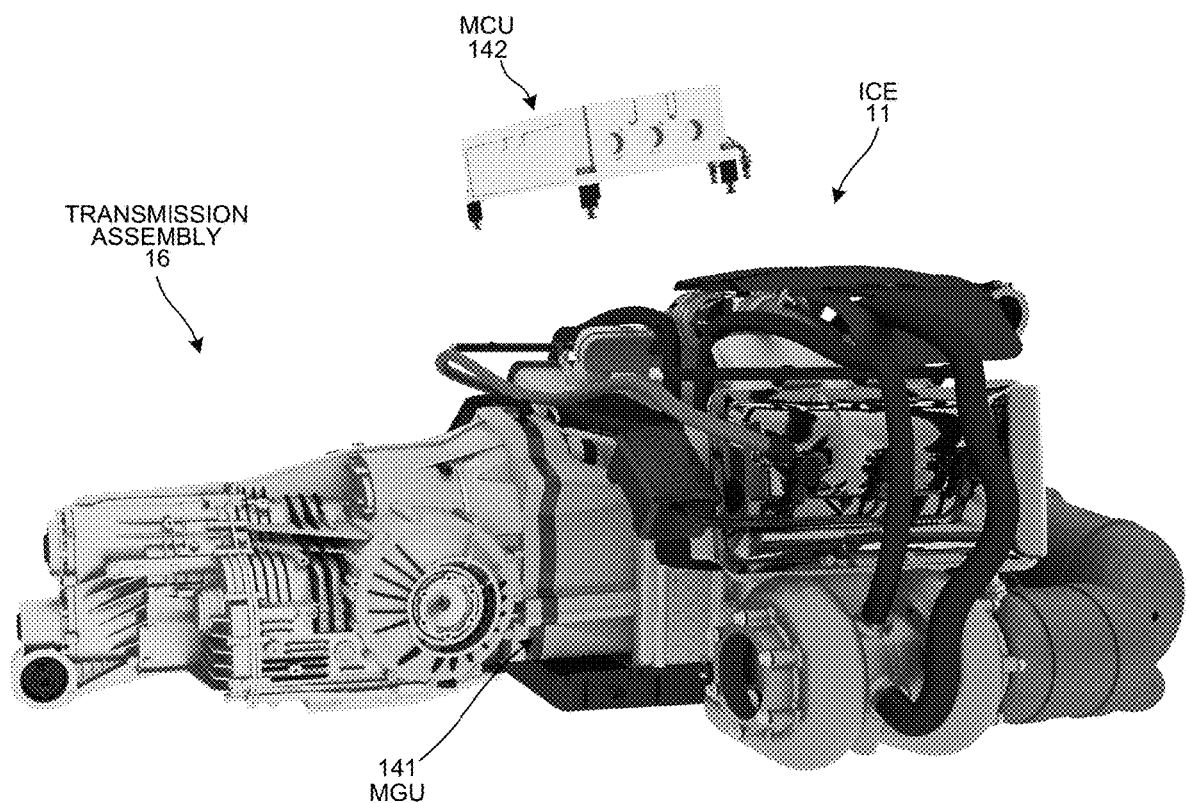
FIG. 8 is a perspective diagram of part of hybrid powertrain 181 after the power system 140 is installed.

FIG. 8 is a perspective diagram of part of hybrid powertrain 181 after the power system 140 is installed. Part of MGU 141 is disposed within transmission bell housing 25 and in some embodiments part of MGU 141 is visible and disposed between transmission bell housing 25 and ICE 11. MCU 142 is attached above engine 11. MGU 141 is disposed between ICE 11 and transmission 14. The supplemental flywheel 182 is disposed within transmission bell housing 25 and is coupled between MGU 141 and transmission 14. In accordance with one novel aspect, EMDRS 100 collects vehicle operator inputs by monitoring existing and familiar inputs including throttle and brake pressure. This simplifies retrofitting and eliminates vehicle operator training requirements. In other embodiments, the EMDRS 100 includes additional vehicle operator inputs, such as a push to pass button or similar types of inputs.

Figure 9:
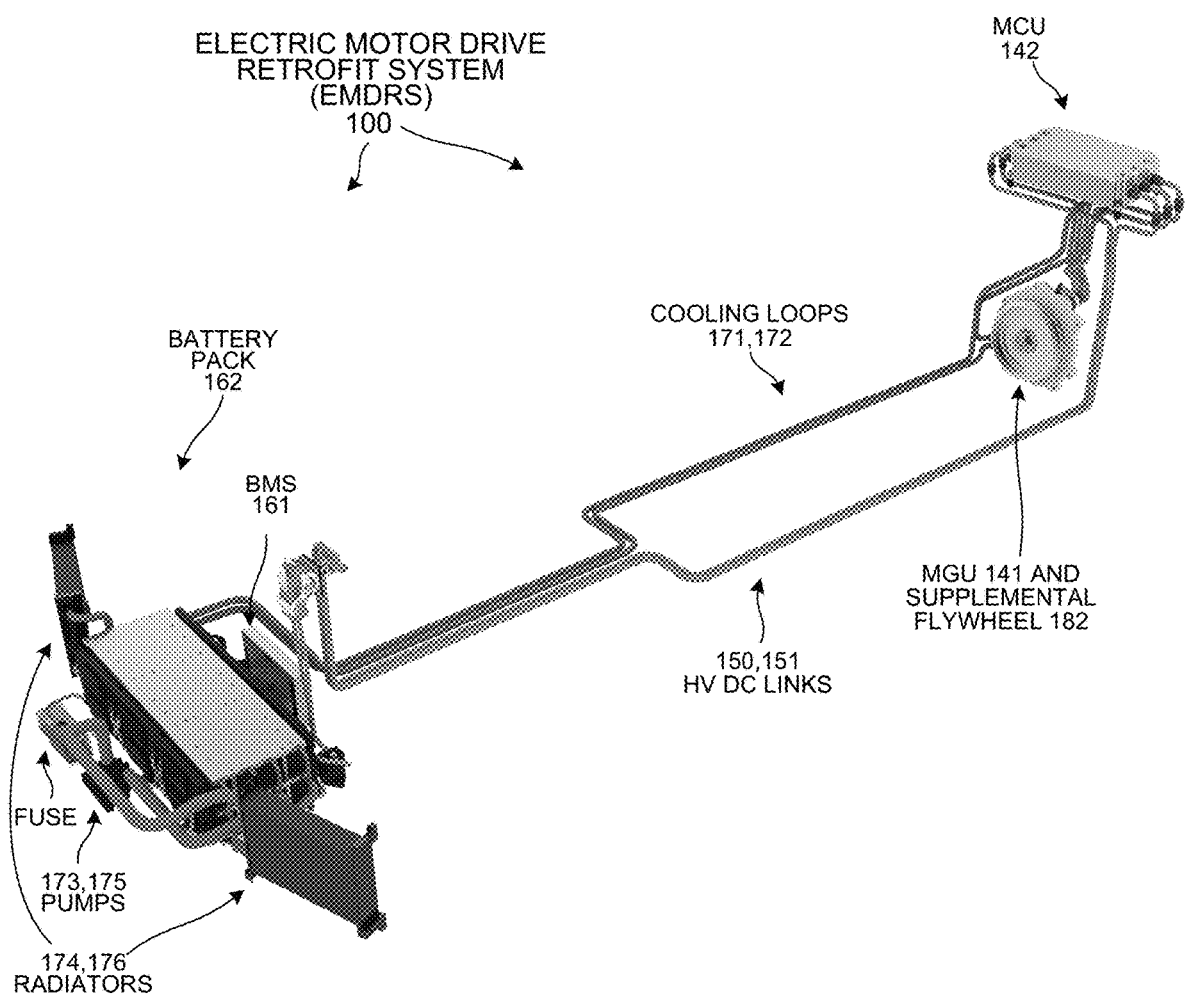
FIG. 9 is a diagram showing a front perspective of the EMDRS 100 showing components in their respective positions after retrofitting.

FIG. 9 is a diagram showing a front perspective of the EMDRS 100 showing components in their respective positions after retrofitting.

Figure 10:
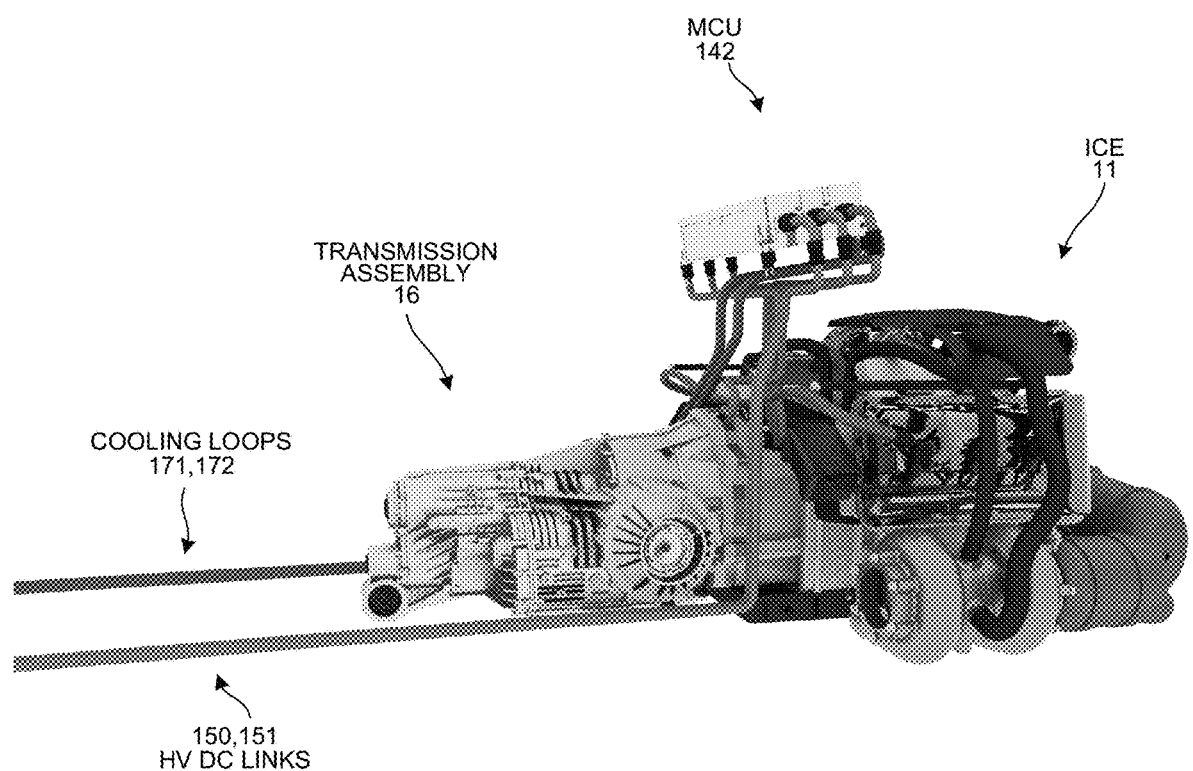
FIG. 10 is a diagram showing a perspective view of ICE 11 and transmission assembly 16 after retrofit of the vehicle 10.

FIG. 10 is a diagram showing a perspective view of ICE 11 and transmission assembly 16 after retrofit of the vehicle 10.

Figure 11:
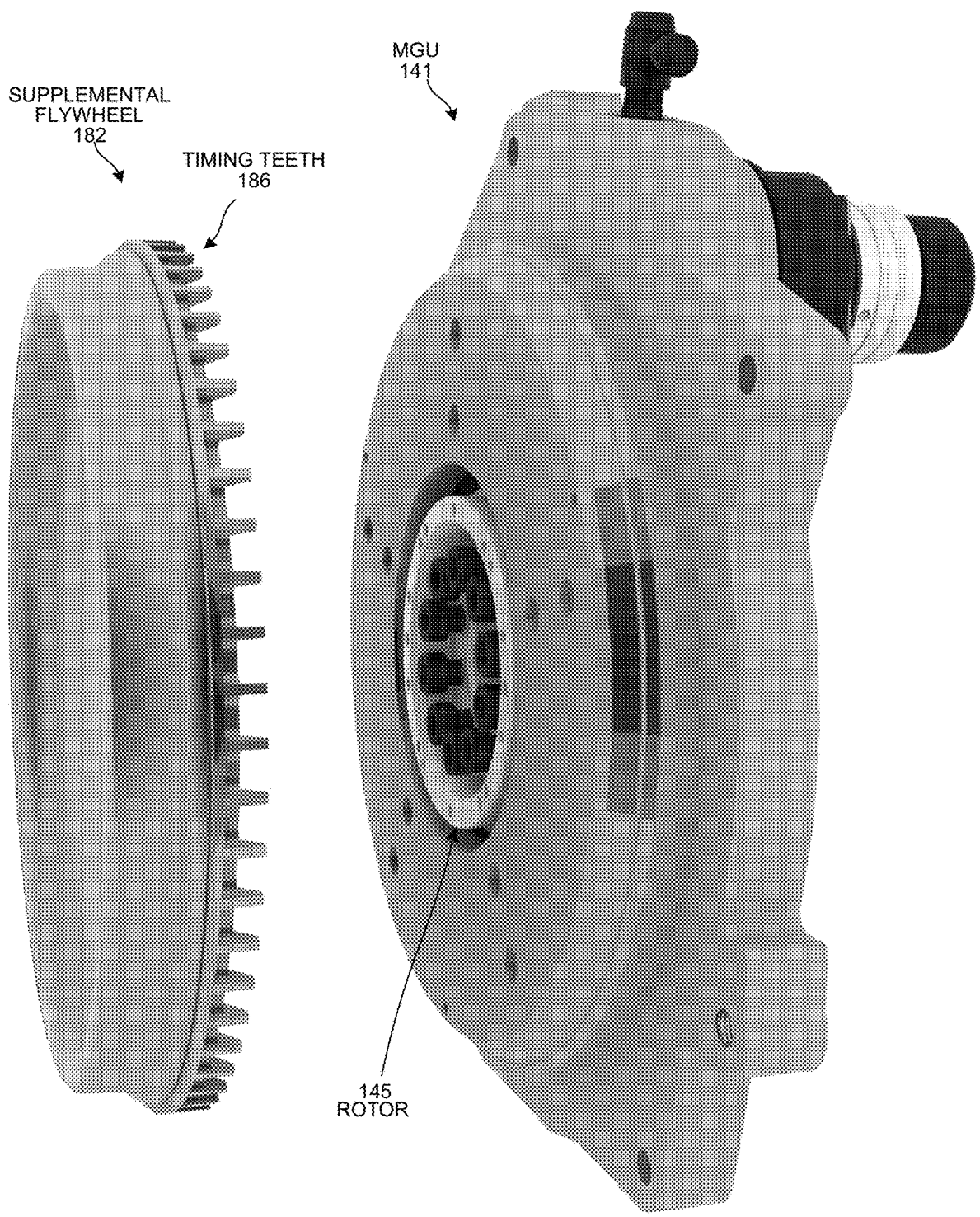
FIG. 11 is a diagram showing a perspective view of the supplemental flywheel 182 and the MGU 141.

FIG. 11 is a diagram showing a perspective view of the supplemental flywheel 182 and the MGU 141. The supplemental flywheel 182 is an important part of EMDRS 100 because several functions of the removed original flywheel 12 need to be reproduced for vehicle 10 to operate. These include providing enough rotational inertia for smooth ICE 11 operation, mounting the clutch assembly 13 and transferring torque to it (for manual transmissions), transferring torque directly to the transmission input 28 (automatic transmissions), having gear teeth around the perimeter that engage the engine starter, and having timing teeth 186 so that a crankshaft position sensor (CPS) can determine the rotational position and speed of the crankshaft. The supplemental flywheel 182 adds its rotational inertia to rotor 145 of MGU 141 to provide sufficient combined inertia for ICE 11. The supplemental flywheel 182 includes clutch mounting or transmission input shaft features as appropriate. In this specific embodiment, supplemental flywheel 182 does not include starter gear teeth because the MGU 141 starts the ICE 11 directly. In this embodiment, supplemental flywheel 182 includes CPS timing teeth 186 to support a relocated CPS.

Figure 12:
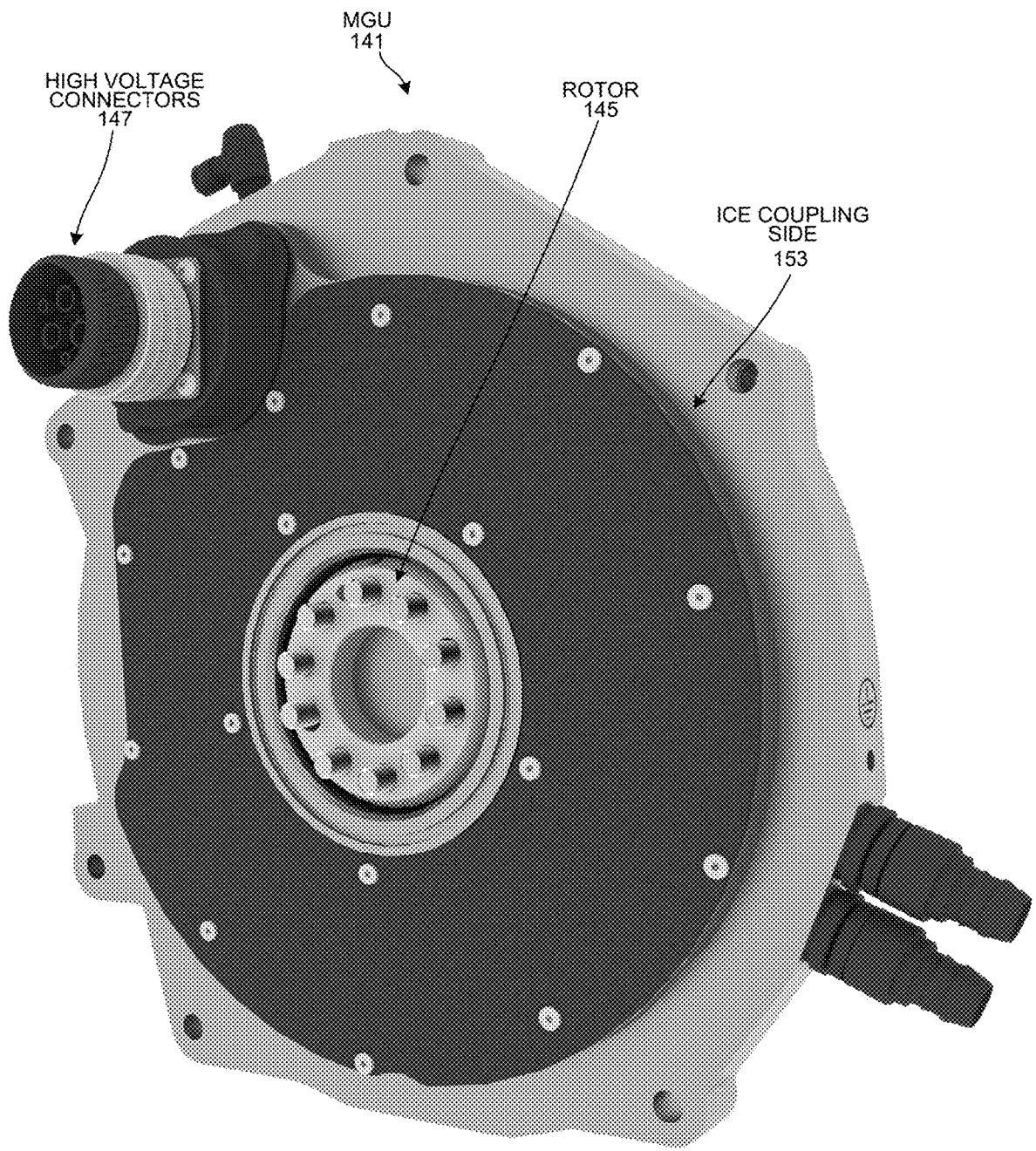
FIG. 12 is a diagram showing a perspective view of the ICE coupling side 153 of the MGU 141.

FIG. 12 is a diagram showing a perspective view of the ICE coupling side 153 of the MGU 141.

Figure 13:
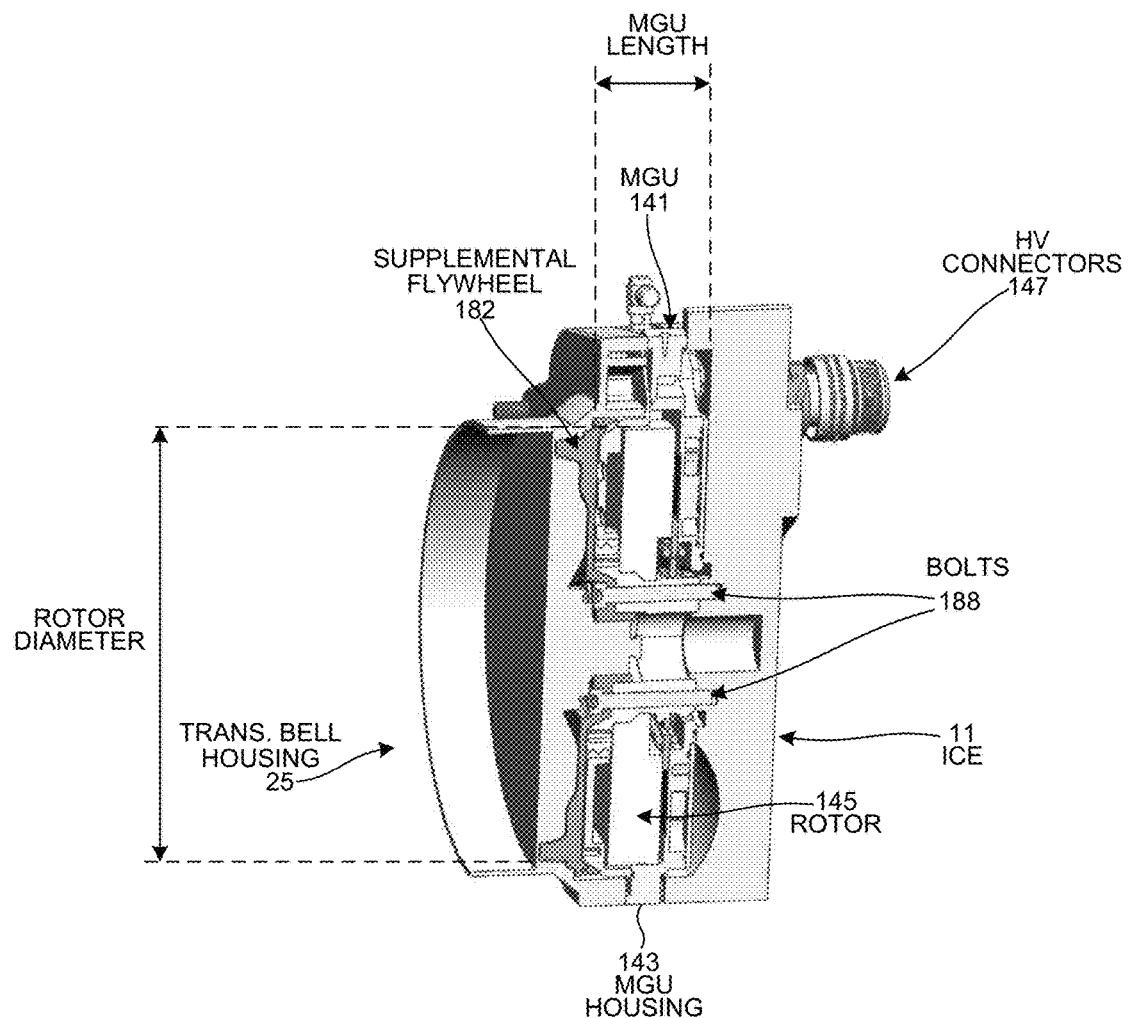
FIG. 13 is a cross sectional diagram of MGU 141.

FIG. 13 is a cross sectional diagram of MGU 141. Bolts 188 couple the rotor 145 and supplemental flywheel 182 to ICE 11 and transmission 14. In accordance with another novel aspect of this embodiment, the MGU 141 has no internal bearings to support rotor 145. The rotor 145 is supported by crankshaft 23 to which the rotor 145 is coupled. The existing crankshaft 23 and its bearings support and position the rotor just as they had supported and positioned the removed flywheel 12. Lack of internal bearings within the MGU 141 facilitates compactness of the MGU 141 and provides for ease of retrofitting.

Figure 14:
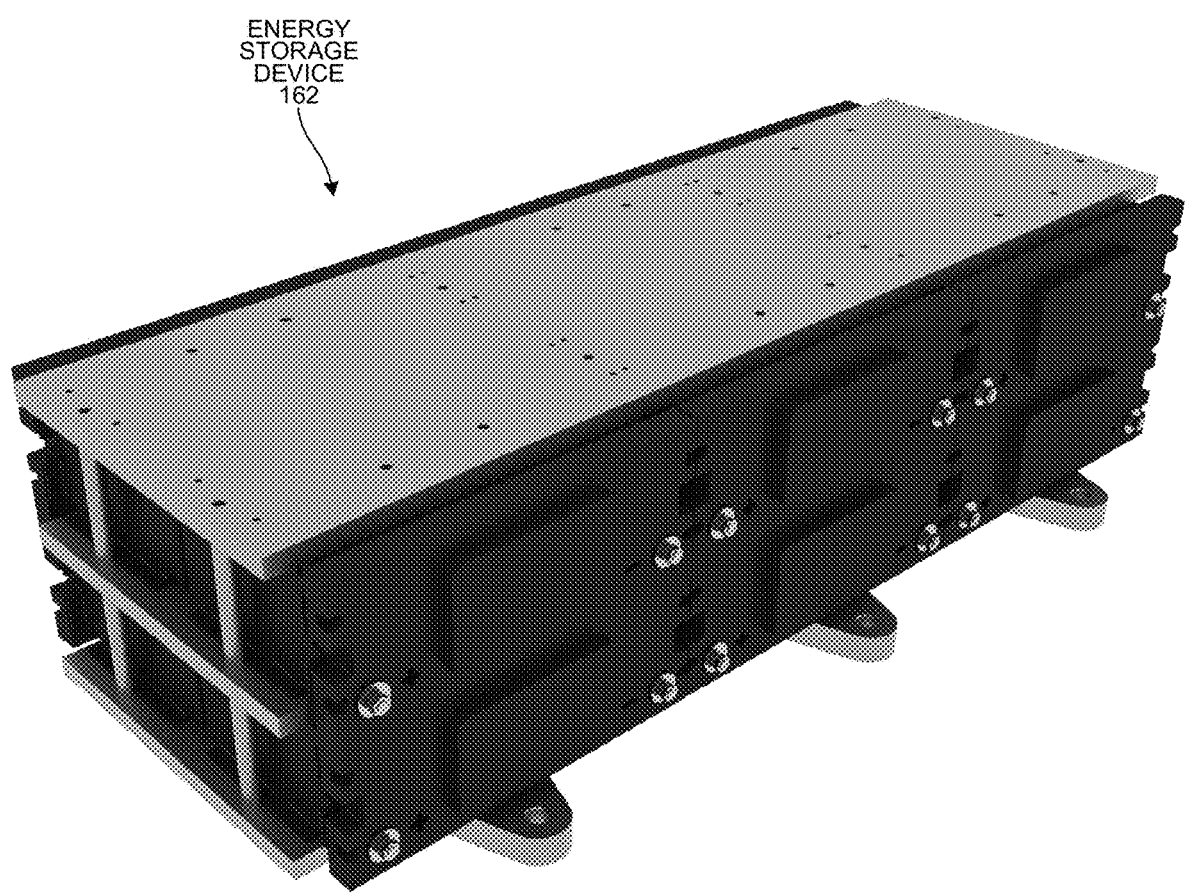
FIG. 14 is a diagram showing a perspective view of energy storage device 162 of the ESS 160.

FIG. 14 is a diagram showing a perspective view of energy storage device 162 of the ESS 160. Energy storage device 162 is of a high power density. Energy storage device 162 is taken from the group consisting of a lithium based battery chemistry device (for example, lithium titanate, lithium iron, or nickel-metal hydride), a flywheel energy storage device, a super capacitor device, hydropneumatics, or combinations, or other energy storage technologies. This high power density facilitates high performance in compact space and facilitates ease of retrofit because less space is needed to fit energy storage device 162 within vehicle 10. In the example of FIG. 14, the energy storage device 162 is a battery pack.

Figure 15:
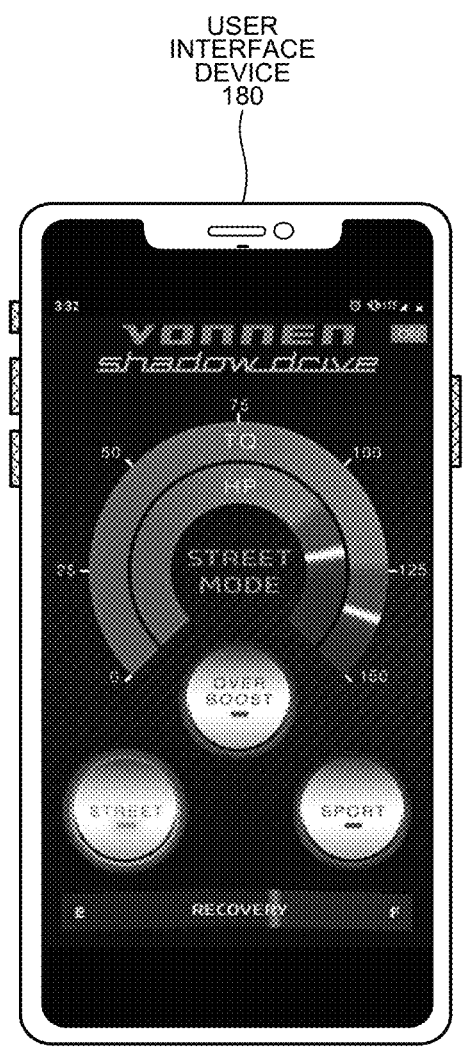
FIG. 15 is a diagram showing the user interface device 180 with a "street" operating mode selected.

FIG. 15 is a diagram showing the user interface device 180 with a "street" operating mode selected.

Figure 16:
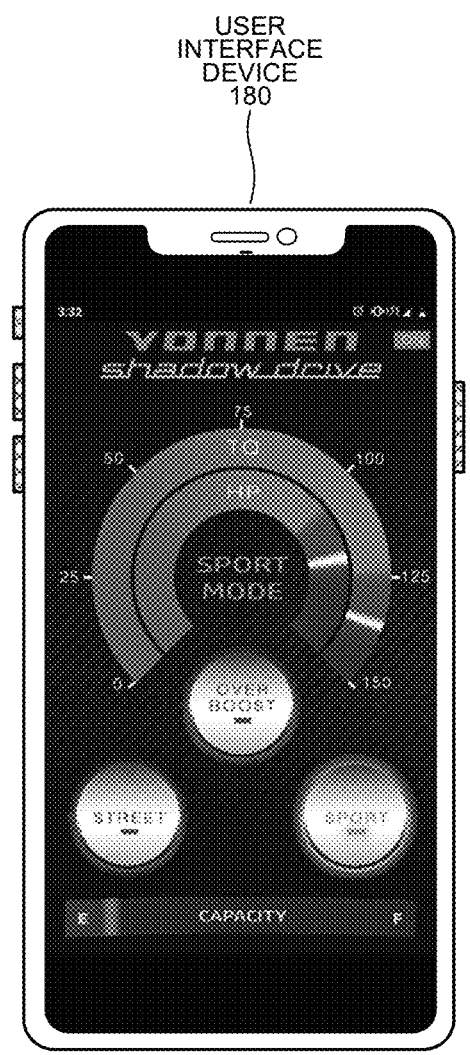
FIG. 16 is a diagram showing the user interface device 180 with a "sport" operating mode selected.

FIG. 16 is a diagram showing the user interface device 180 with a "sport" operating mode selected.

Figure 17:
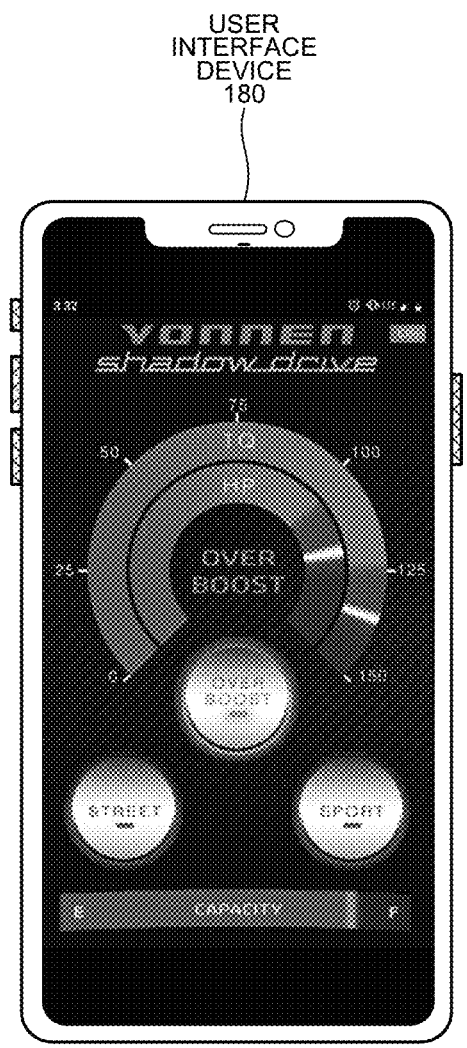
FIG. 17 is a diagram showing the user interface device 180 with an "over boost" operating mode selected.

FIG. 17 is a diagram showing the user interface device 180 with an "over boost" operating mode selected. The "street" operating mode, the "sport" operating mode, and the "over boost" operating mode are but only a few examples of possible selected operating modes. Other selectable operating modes exist. In other embodiments, the selected operating mode is determined by VCU 110 using an artificial intelligence engine.

Figure 18:
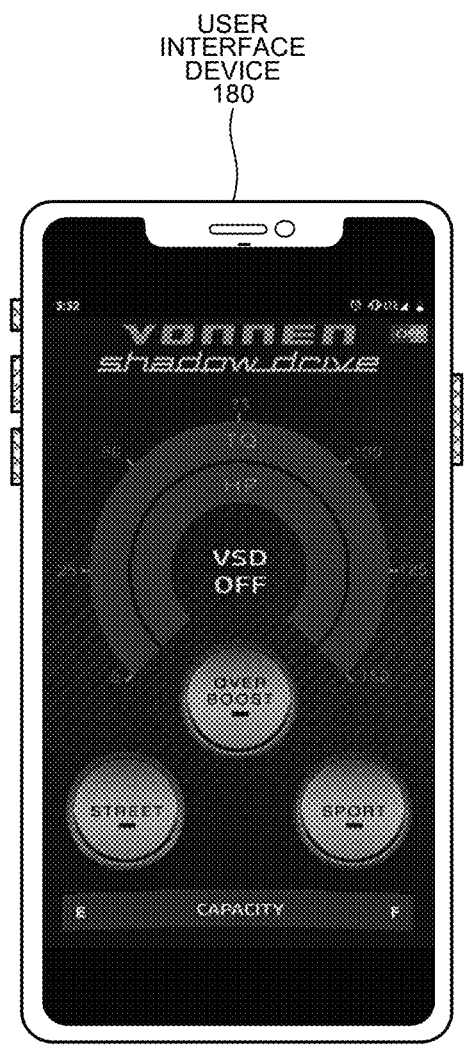
FIG. 18 is a diagram showing the user interface device 180 with the EMDRS 100 turned "off".

FIG. 18 is a diagram showing the user interface device 180 with the EMDRS 100 turned "off". When EMDRS 100 is off, the MGU 141 does not supply or remove torque from the powertrain of vehicle 10 based on driver inputs and the powertrain is powered only by ICE 11. It will still start the engine when the vehicle circuitry 131 sends that command.

Figure 19:
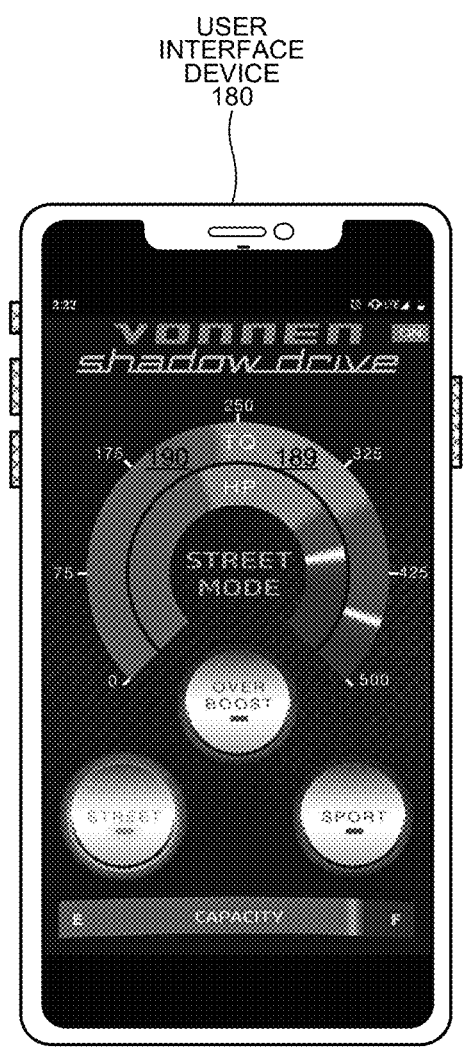
FIG. 19 is a diagram showing the user interface device 180 with a "street" operating mode selected.

FIG. 19 is a diagram showing the user interface device 180 with a "street" operating mode selected. Performance information is presented to a vehicle operator on a display of the user interface device 180. Portion 189 of dial illustrates torque added to powertrain of vehicle 10 by EMDRS 100. Portion 190 of dial illustrates torque added to powertrain of vehicle 10 by ICE 11.

Figure 20:
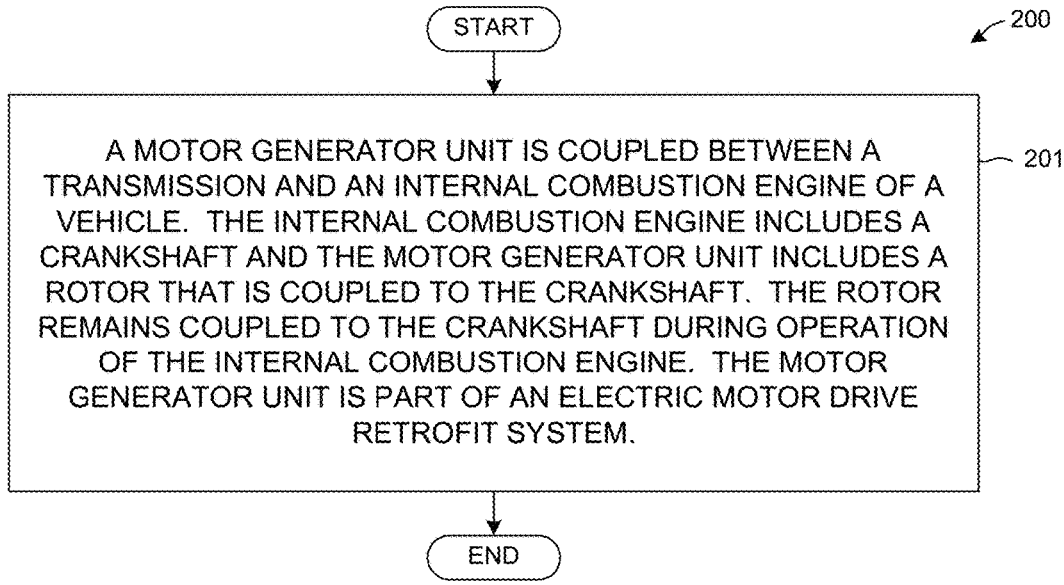
FIG. 20 is a flowchart of a method 200 in accordance with another novel aspect.

FIG. 20 is a flowchart of a method 200 in accordance with another novel aspect. Method 200 is part of a retrofit method yielding an aftermarket upgrade. The method 200 is performed as an aftermarket upgrade to a vehicle supplied by a vehicle supplying entity. In one example, the vehicle supplying entity is a vehicle manufacturer. The vehicle as supplied by the vehicle supplying entity is designed to operate with a combustion engine powertrain and has tight space constraints within the powertrain. Novel method 200 permits retrofitting to incorporate EMDRS 100 despite these tight space constraints. In a first step (step 201), a motor generator unit is coupled between a transmission and an internal combustion engine of a vehicle. The internal combustion engine includes a crankshaft and the motor generator unit includes a rotor that is coupled to the crankshaft. The rotor remains coupled to the crankshaft during operation of the internal combustion engine. The motor generator unit is part of an electric motor drive retrofit system.

Figure 21:
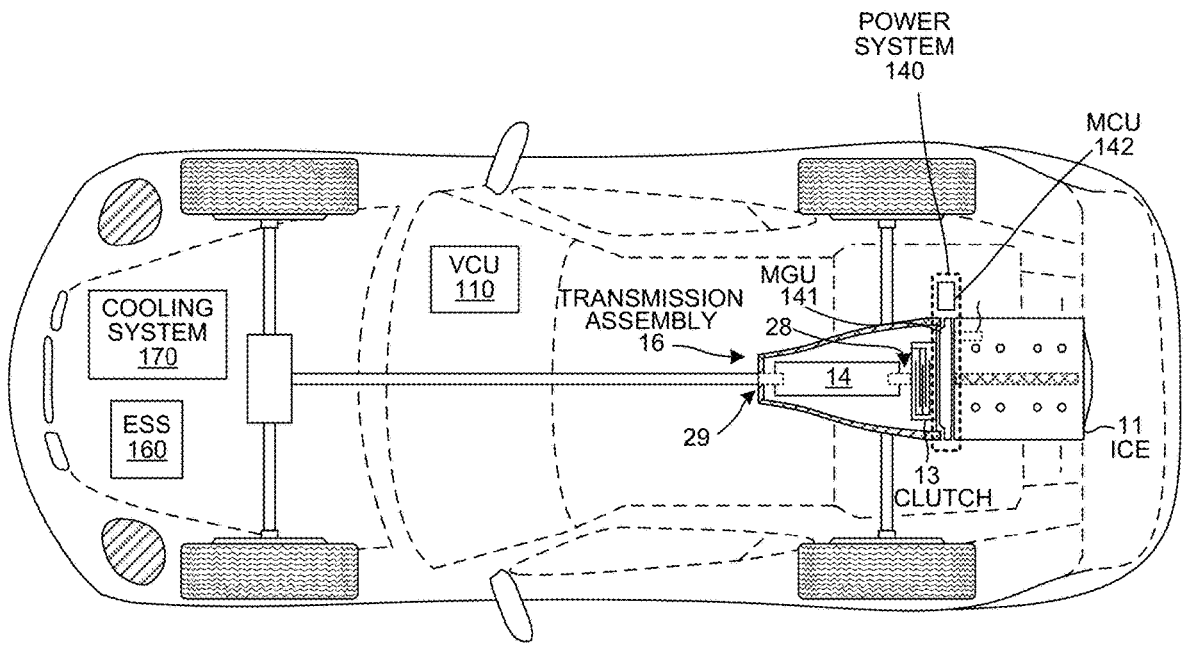
FIG. 21 is a diagram showing another embodiment of retrofitting vehicle 10 with an EMDRS 100.

FIG. 21 is a diagram showing another embodiment of retrofitting vehicle 10 with an EMDRS 100. In the example of FIG. 21, the MGU 141 is coupled without any supplement flywheel. The MGU 141 is coupled directly between ICE 11 and clutch 13.

Figure 22:
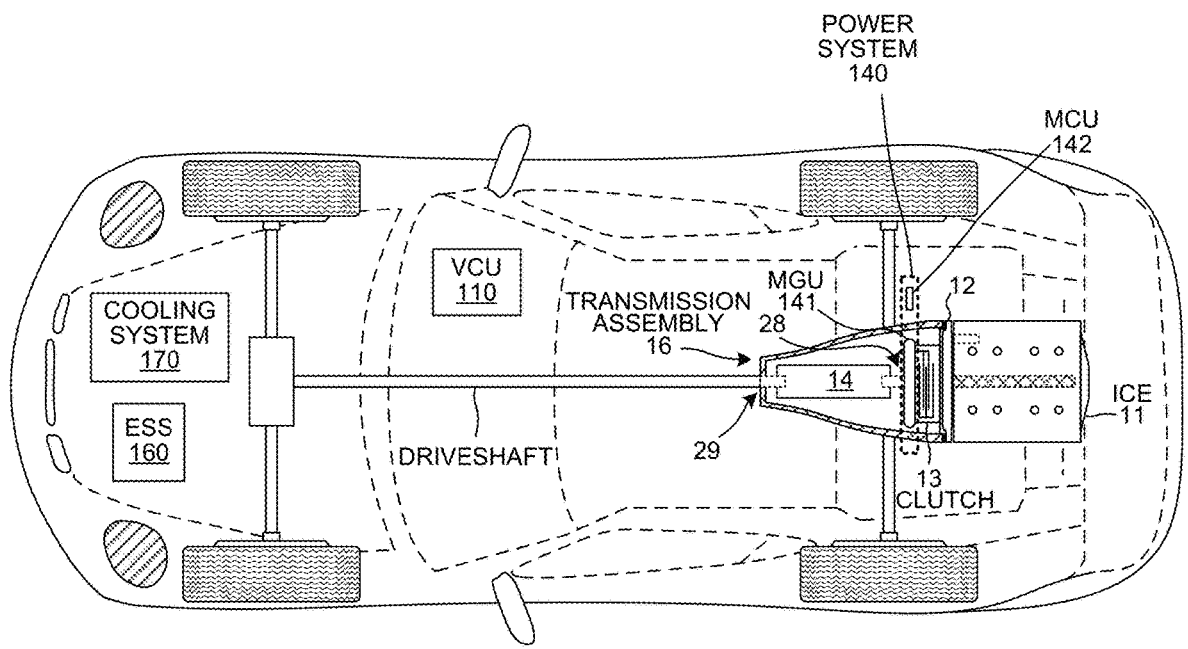
FIG. 22 is a diagram showing another embodiment of retrofitting vehicle 10 with an EMDRS 100.

FIG. 22 is a diagram showing another embodiment of retrofitting vehicle 10 with an EMDRS 100. In the example of FIG. 22, the MGU 141 is coupled between the clutch 13 and transmission input 28. The original flywheel 12 is retained.

Figure 23:
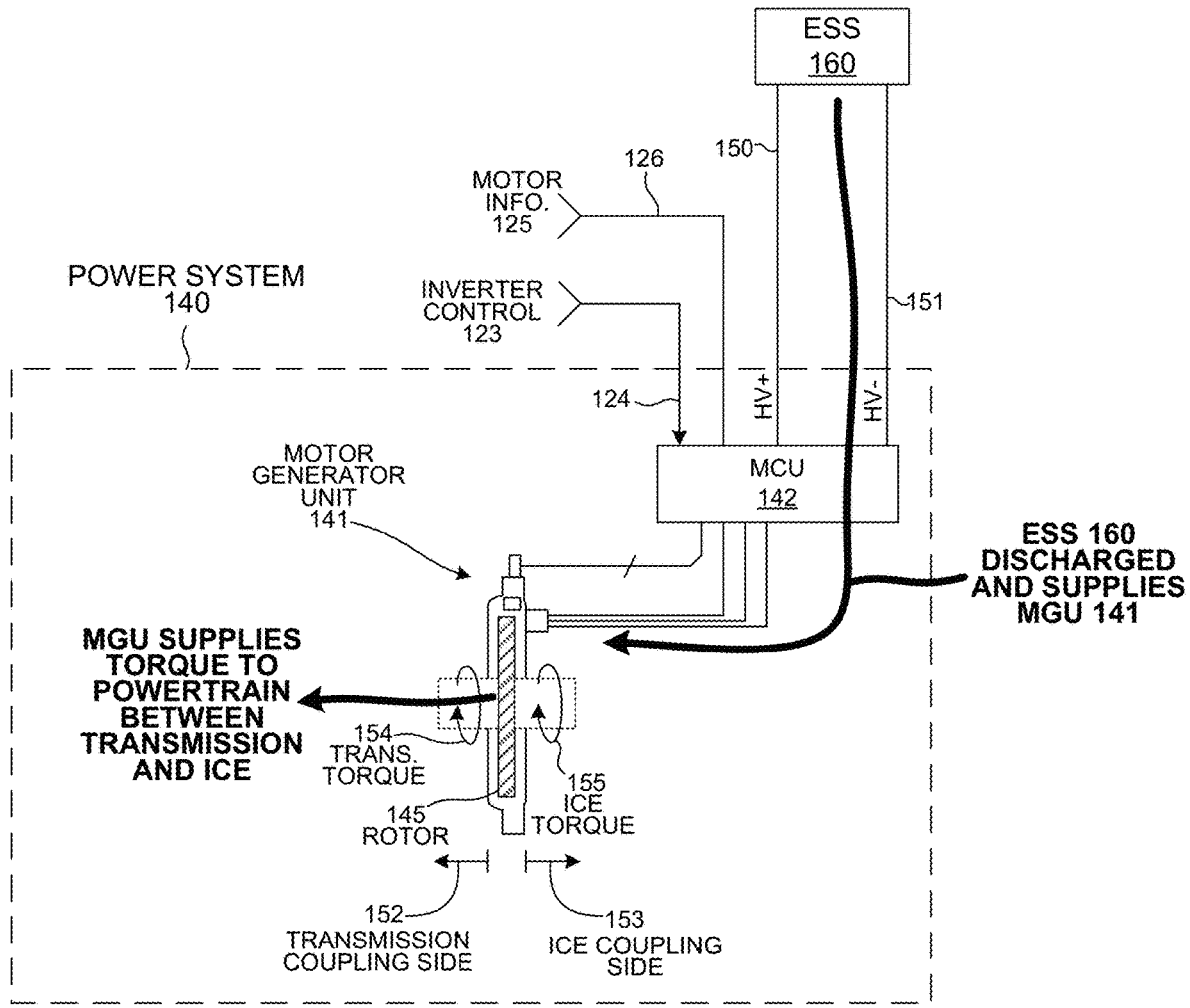
FIG. 23 is a diagram showing a torque supplying operating mode of the EMDRS 100.

FIG. 23 is a diagram showing a torque-supplying operating mode of the EMDRS 100. In the torque supplying operating mode, ESS 160 is discharged and supplies MGU 141. MGU 141 converts received electrical energy into mechanical torque that is applied to the powertrain between transmission 14 and ICE 11.

Figure 24:
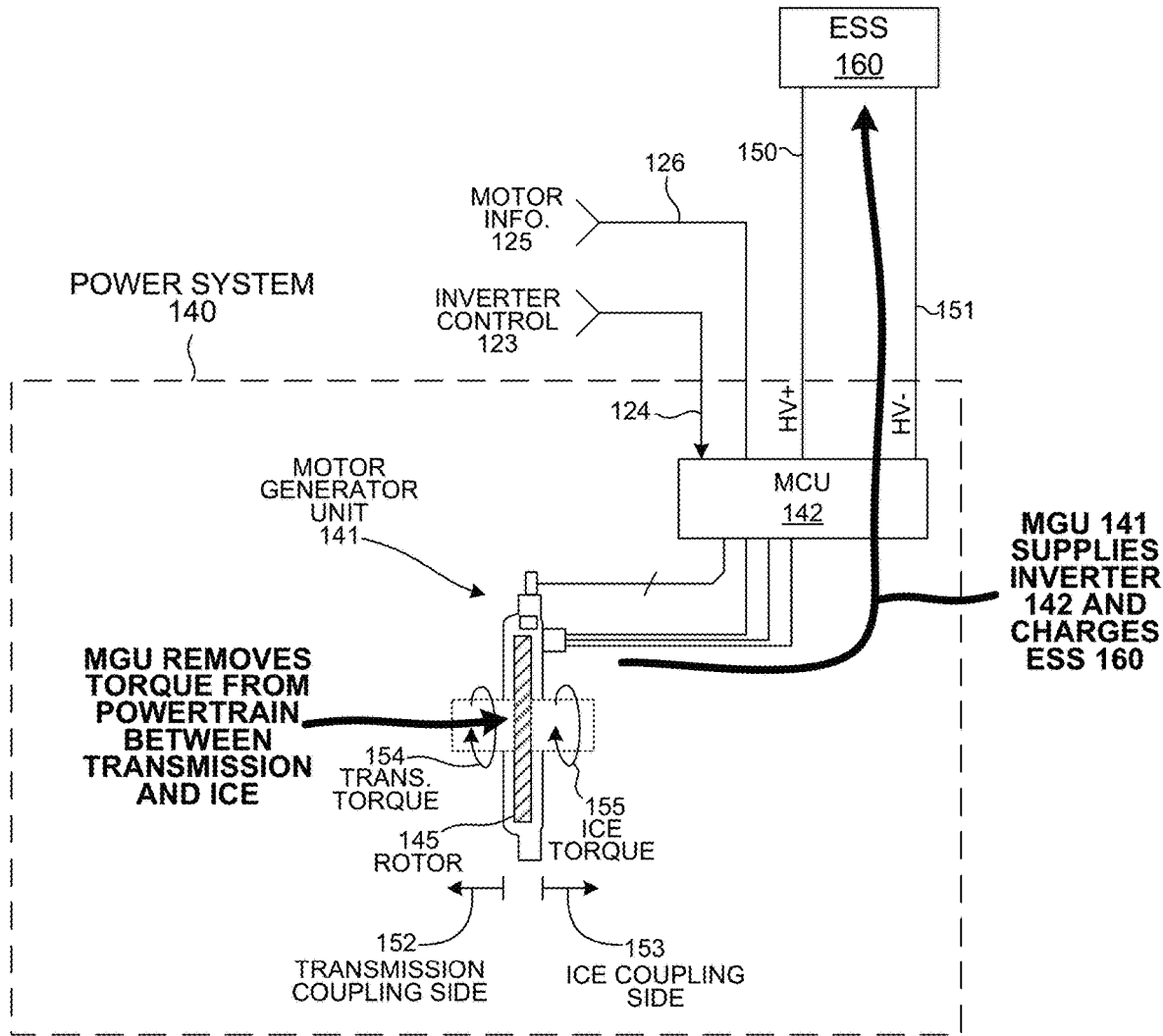
FIG. 24 is a diagram showing a torque removing operating mode of the EMDRS 100.

FIG. 24 is a diagram showing a torque-removing operating mode of the EMDRS 100. In the torque removing operating mode, MGU 141 removes torque from powertrain between transmission 14 and ICE 11. MGU converts this mechanical torque from the powertrain into electrical energy supplied to MCU 142 which in turn charges ESS 160.

Figure 25:
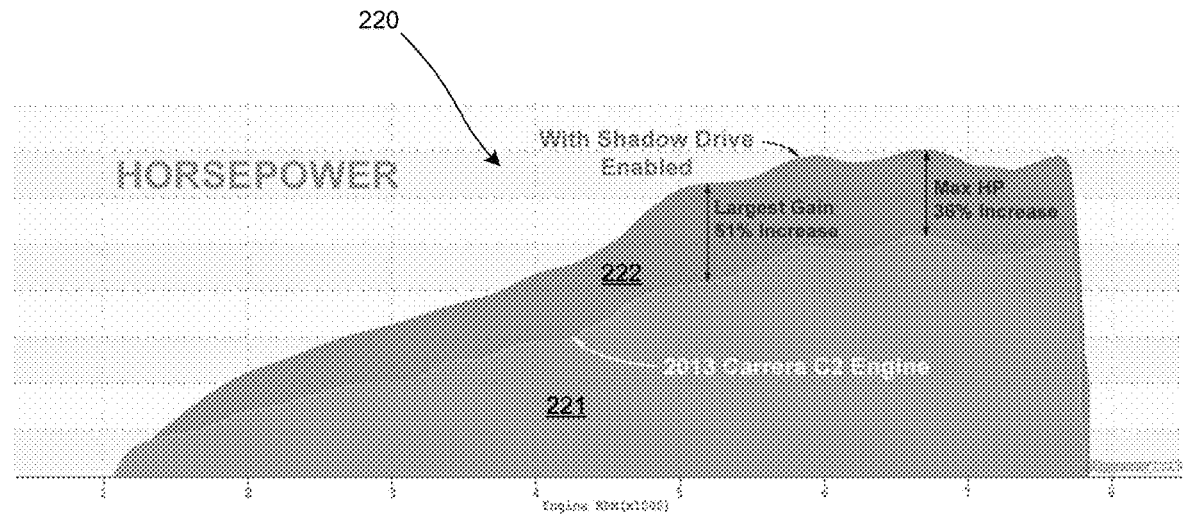
FIG. 25 is a graph 220 showing horsepower added by EMDRS 100 in one embodiment.

FIG. 25 is a graph 220 showing horsepower added by EMDRS 100 in one embodiment. This embodiment involves a 2013 Porsche 911 Carrera retrofitted with EMDRS 100. EMDRS 100 adds over forty percent more horsepower than is supplied by ICE 11. Portion 221 identifies horsepower generated and supplied to the powertrain by ICE 11. Portion 222 identifies horsepower generated and supplied to the powertrain by MGU 141. It is understood that in other embodiments, more or less horsepower is added than shown depending on selected operating modes and selected EMDRS used to retrofit the vehicle.

Figure 26:
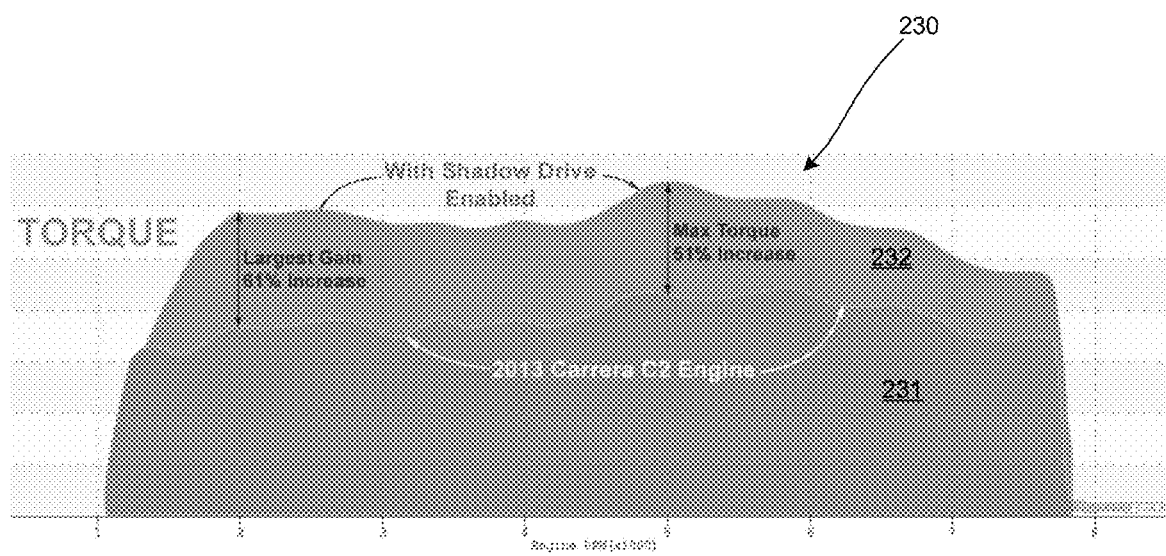
FIG. 26 is a graph 230 showing torque added by EMDRS 100 in one embodiment.

FIG. 26 is a graph 230 showing torque added by EMDRS 100 in one embodiment. EMDRS 100 adds over fifty percent more torque than is supplied by ICE 11. Portion 231 identifies torque generated and supplied to the powertrain by ICE 11. Portion 232 identifies torque generated and supplied to the powertrain by MGU 141. It is understood that in other embodiments, more or less torque is added than shown depending on selected operating modes and selected EMDRS used to retrofit the vehicle.

Figure 27:
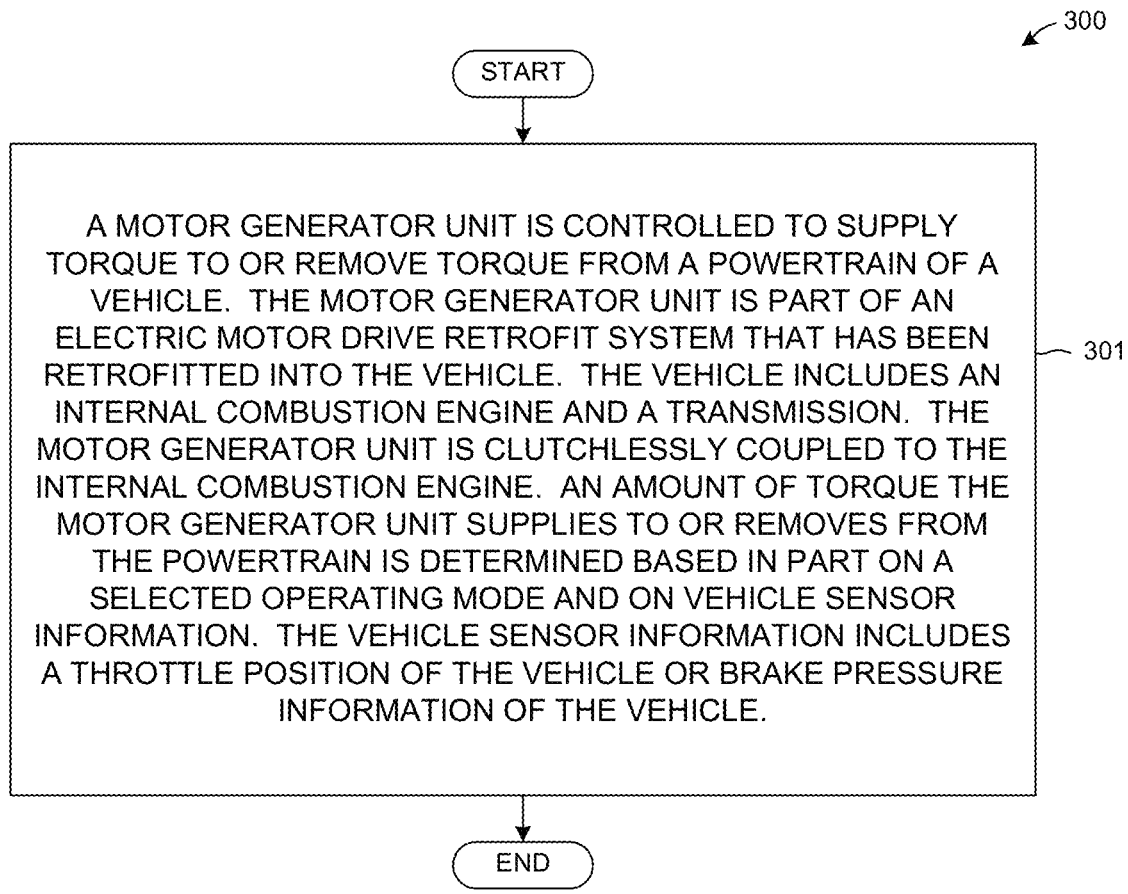
FIG. 27 is a flowchart of a method 300 in accordance with another novel aspect.

FIG. 27 is a flowchart of a method 300 in accordance with another novel aspect. In a first step (301), a motor generator unit is controlled to supply torque to or remove torque from a powertrain of a vehicle. The motor generator unit is part of an electric motor drive retrofit system that has been retrofitted into the vehicle. The vehicle includes an internal combustion engine and a transmission. The motor generator unit is clutchlessly coupled to the internal combustion engine. An amount of torque the motor generator unit supplies to or removes from the powertrain is determined based in part on a selected operating mode and on vehicle sensor information. The vehicle sensor information includes a throttle position of the vehicle or brake pressure information of the vehicle.

Figure 28:
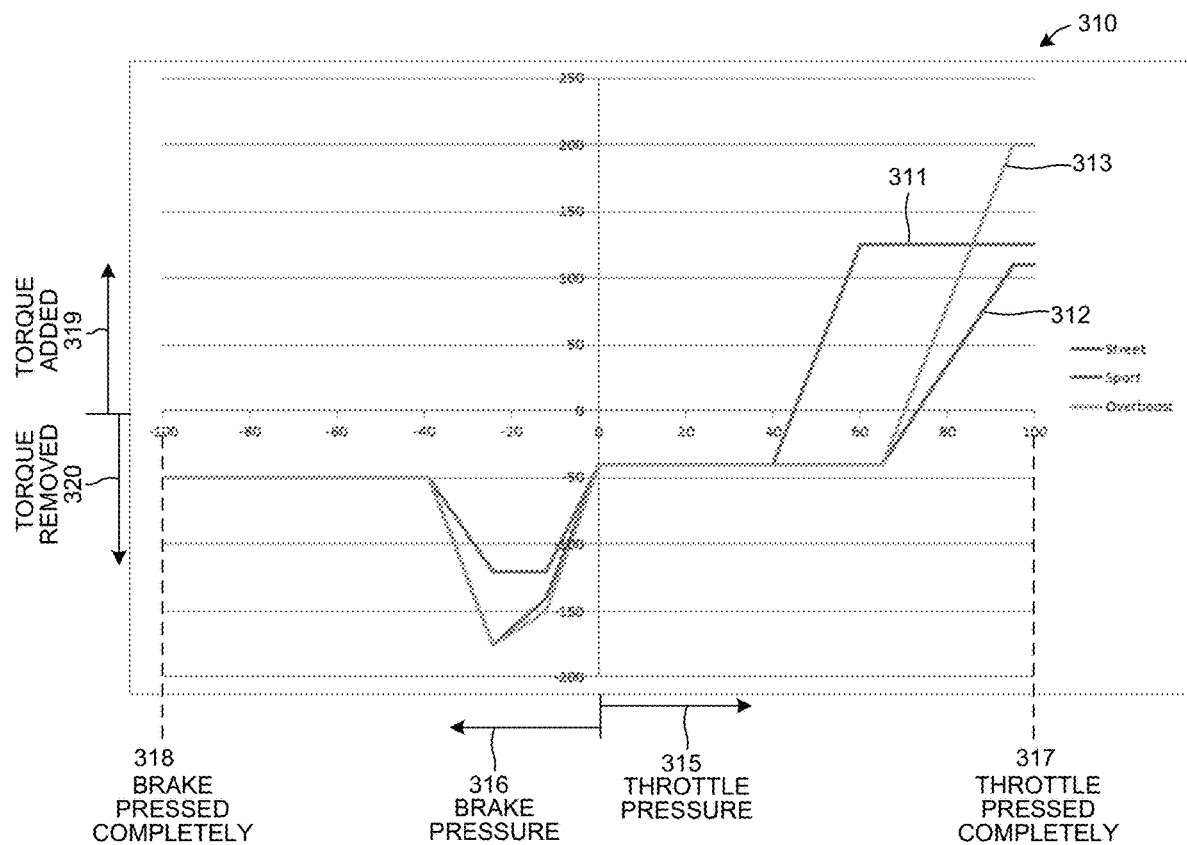
FIG. 28 is a graph 310 showing how EMDRS 100 is controlled based on a selected operating mode and vehicle sensor information.

FIG. 28 is a graph 310 showing how EMDRS 100 is controlled based on a selected operating mode and vehicle sensor information. Instructions 116 stored in memory 112 are read and executed by the processor 111. When executed by the processor 111, the processor 111 caries out particular control algorithms corresponding to various modes of operation. These control algorithms achieve differing balance and tradeoff with respect to competing objectives. Various embodiments include operating modes for maximizing fuel efficiency, racing, quiet operation, enhanced performance, and idle operation.

In this specific embodiment, vehicle sensor information includes throttle pressure and brake pressure. Control characteristics for three selected operating modes are shown. Plot 311 corresponds to control characteristics when the "street" operating mode is selected. Plot 312 corresponds to control characteristics when the "sport" operating mode is selected. Plot 313 corresponds to control characteristics when the "over boost" operating mode is selected. A right-side 315 of a x-axis of graph 310 indicates throttle pressure. A left-side 316 of the x-axis of graph 310 indicates brake pressure. Reference numeral 317 identifies a condition where the throttle of the vehicle 10 is completely pressed. Reference numeral 318 identifies a condition where the brake of the vehicle 10 is completely pressed. An upper side 319 of a y-axis of the graph 310 shows a torque level corresponding to torque that is added to the powertrain. A lower side 320 of the y-axis of the graph 310 shows a torque level corresponding to torque that is removed from the powertrain. In this example, the torque level is a numeric value that extends from "0" through "200".

It is appreciated that other control methodologies are possible and that other control techniques do not necessarily involve brake and throttle pressure. In another embodiment, a "push to pass" button is used to activate EMDRS 100. In another embodiment, VCU 110 is pre-programmed to allow or limit power delivery or regeneration based on location information of vehicle 10. For example, in the case of a closed track with a known slow corner, VCU 110 detects when the vehicle 10 exists the slow corner and causes EMDRS 100 to ramp up torque delivery after exiting the slow corner. VCU 111 monitors driver inputs, vehicle status, system status, and other inputs to determine how much torque to deliver or consume and the timing and ramping of the torque delivery and consumption. Torque delivery may be based on a state of charge of an energy storage device, motor temperature of the vehicle, location information of the vehicle, a gear setting of the vehicle, a next desired gear setting of the vehicle, and optimizing fuel economy.

Figure 29:
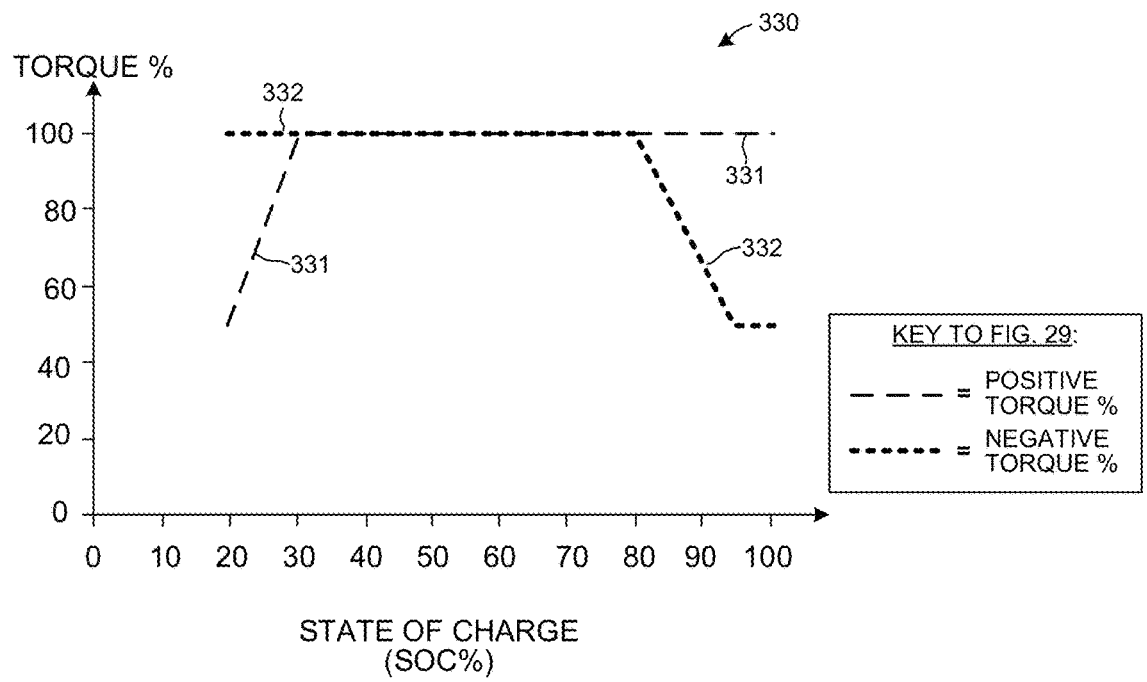
FIG. 29 is a graph 330 showing how, in one embodiment, EMDRS 100 is controlled by limiting torque output depending on the state of charge of ESS 160.

FIG. 29 is a graph 330 showing how in one embodiment, EMDRS 100 is controlled by limiting torque output depending on the state of charge of ESS 160. Plot 331 shows relative limits on torque supplied to the powertrain as the state of charge of the ESS 160 nears the bottom of its allowed range. Plot 332 shows relative limits on torque removed from the powertrain as the state of charge of the ESS 160 nears the top of its allowed range.

A novel aspect of this embodiment is how the thermal and energy capacities are used. As a retrofit system the ICE powertrain is able to meet all driving needs, but the EMDRS 100 provides additional performance or efficiency when active. As such, the hybrid system's capacities are able to be pushed to their limits and then allowed to recover before the next use. These "recovery periods" have pre-determined trigger and release points that include an ESS SOC recovery period and a system temperature recovery period. The ESS SOC recovery period is triggered when an ESS SOC threshold level is reached. The system temperature recovery period is triggered when a system temperature threshold is reached. For example, the ESS SOC recovery period can be triggered when the SOC reaches a 20% minimum, and then released when it recovers to 40%.

Figure 30:
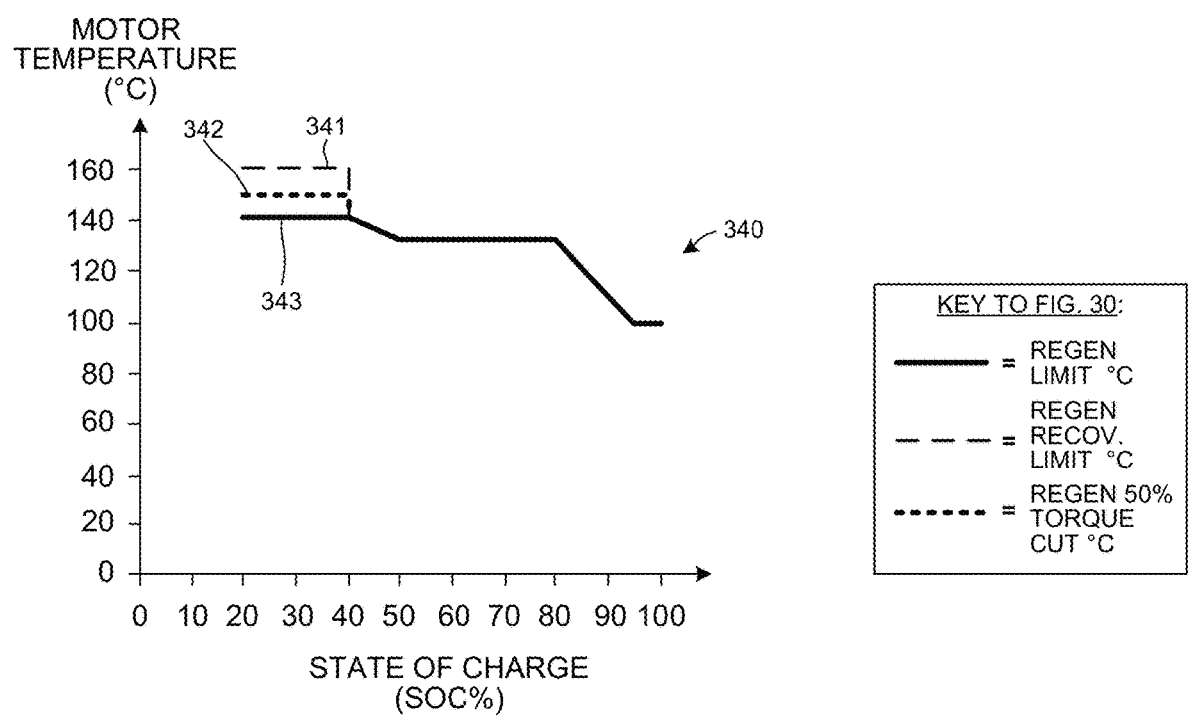
FIG. 30 is a graph 340 showing how, in one embodiment, EMDRS 100 is controlled by limiting torque removed from the powertrain depending on the state of charge of ESS 160 and motor temperature.

FIG. 30 is a graph 340 showing how, in one embodiment, EMDRS 100 is controlled by limiting torque removed from the powertrain (for ESS recharging) depending on the state of charge of ESS 160 and motor temperature. Plot 343 shows how the maximum motor temperature for which torque removal will be allowed increases as the SOC decreases. Plot 341 shows how if the system enters a SOC recovery period, the motor temperature threshold for regenerative ESS charging will be temporarily raised up to the maximum operating temperature. Plot 342 shows how if the motor temperature is above the indicated temperature the removed torque will be cut by 50%.

Figure 31:
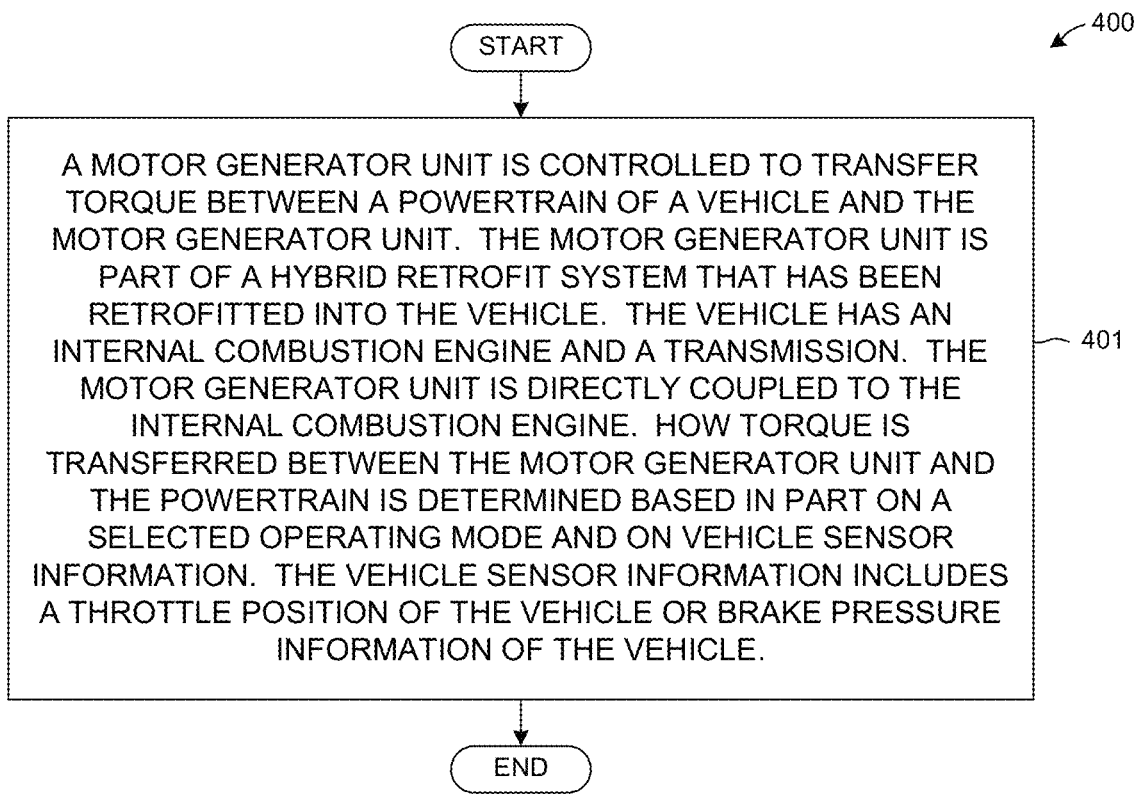
FIG. 31 is a flowchart of a method 400 in accordance with another novel aspect.

FIG. 31 is a flowchart of a method 400 in accordance with another novel aspect. In a first step (401), a motor generator unit is controlled to transfer torque between a powertrain of a vehicle and the motor generator unit. The motor generator unit is part of a hybrid retrofit system that has been retrofitted into the vehicle. The vehicle has an internal combustion engine and a transmission. The motor generator unit is directly coupled to the internal combustion engine. How torque is transferred between the motor generator unit and the powertrain is determined based in part on a selected operating mode and on vehicle sensor information. The vehicle sensor information includes a throttle position of the vehicle or brake pressure information of the vehicle.

Figure 32:
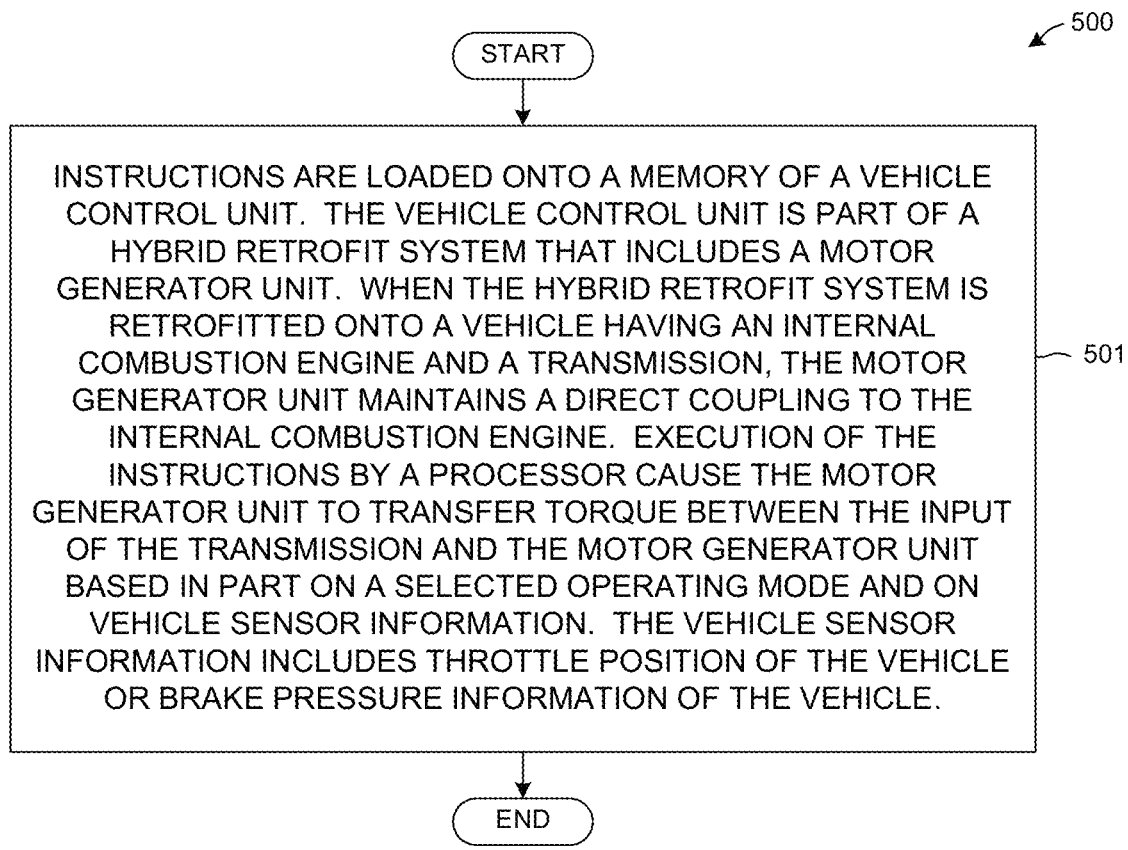
FIG. 32 is a flowchart of a method 500 in accordance with another novel aspect.

FIG. 32 is a flowchart of a method 500 in accordance with another novel aspect. In a first step (501), instructions are loaded onto a memory of a vehicle control unit. The vehicle control unit is part of a hybrid retrofit system that includes a motor generator unit. When the hybrid retrofit system is retrofitted onto a vehicle having an internal combustion engine and a transmission, the motor generator unit maintains a direct coupling to the internal combustion engine. Execution of the instructions by a processor cause the motor generator unit to transfer torque between the input of the transmission and the motor generator unit based in part on a selected operating mode and on vehicle sensor information. The vehicle sensor information includes throttle position of the vehicle or brake pressure information of the vehicle.

Although certain specific exemplary embodiments are described above in order to illustrate the invention, the invention is not limited to the specific embodiments. In other embodiments, EMDRS 100 includes software Over-the-air (OTA) updates or diagnostic functions, GPS-based functionality, and direct social media sharing. For additional information on the structure and function of EMDRS 100, see: (1) U.S. Provisional Patent Application Ser. No. 62/736,920, entitled "Hybrid system for vehicles," filed on Sep. 26, 2018, by Moreland (the entire subject matter of this patent document is hereby incorporated by reference). Accordingly, various modifications, adaptations, and combinations of various features of the described embodiments can be practiced without departing from the scope of the invention as set forth in the claims.

What is claimed is:

1. A method comprising:
controlling a motor generator unit to supply torque to or remove torque from a powertrain of a vehicle, wherein the motor generator unit is part of an electric motor drive retrofit system that has been retrofitted into the vehicle, wherein the vehicle includes an internal combustion engine and a transmission, wherein the motor generator unit is clutchlessly coupled to the internal combustion engine, wherein the motor generator unit is coupled between the transmission and the internal combustion engine, wherein an amount of torque the motor generator unit supplies to or removes from the powertrain is determined based in part on a selected operating mode and on vehicle sensor information, and wherein the vehicle sensor information includes at least one of: a throttle position of the vehicle, and brake pressure information of the vehicle.

2. The method of claim 1, further comprising:
receiving vehicle sensor information onto a vehicle control unit, wherein the vehicle control unit is part of the electric motor drive retrofit system.

3. The method of claim 2, wherein the vehicle sensor information is provided by an engine control unit of the vehicle, and wherein the controlling is performed without the engine control unit receiving communications from the vehicle control unit.

4. The method of claim 1, wherein the electric motor drive retrofit system includes an energy storage device, wherein the vehicle sensor information includes system temperatures, and wherein the amount of torque the motor generator unit supplies to or removes from the powertrain is limited based on at least one of a state of charge of the energy storage device or system temperatures.

5. The method of claim 1, further comprising:
controlling the motor generator unit to decrease the amount of torque supplied to the powertrain over a period of time, wherein during the period of time, the internal combustion engine supplies torque to the powertrain required to maintain vehicle speed.

6. The method of claim 1, wherein the amount of torque the motor generator unit supplies to or removes from the powertrain is based in part on location information of the vehicle.

7. The method of claim 1, wherein the vehicle sensor information includes gear setting information, and wherein the amount of torque the motor generator unit supplies to or removes from the powertrain is based in part on the gear setting thereby avoiding a powertrain overstress condition.

8. A method comprising:
controlling a motor generator unit to supply torque to or remove torque from a powertrain of a vehicle, wherein the motor generator unit is part of an electric motor drive retrofit system that has been retrofitted into the vehicle, wherein the vehicle includes an internal combustion engine and a transmission, wherein the motor generator unit is clutchlessly coupled to the internal combustion engine, wherein an amount of torque the motor generator unit supplies to or removes from the powertrain is determined based in part on a selected operating mode and on vehicle sensor information, wherein the vehicle sensor information includes at least one of: a throttle position of the vehicle, and brake pressure information of the vehicle, wherein the amount of torque the motor generator unit supplies to or removes from the powertrain is based on a combined output setting of both the electric motor drive retrofit system and the internal combustion engine output, and wherein the combined output setting is a combined maximum torque setting or a combined maximum power setting.

9. A method comprising:
controlling a motor generator unit to supply torque to or remove torque from a powertrain of a vehicle, wherein the motor generator unit is part of an electric motor drive retrofit system that has been retrofitted into the vehicle, wherein the vehicle includes an internal combustion engine and a transmission, wherein the motor generator unit is clutchlessly coupled to the internal combustion engine, wherein an amount of torque the motor generator unit supplies to or removes from the powertrain is determined based in part on a selected operating mode and on vehicle sensor information, wherein the vehicle sensor information includes at least one of: a throttle position of the vehicle, and brake pressure information of the vehicle, wherein the vehicle sensor information includes current gear setting information and next gear setting information, and wherein the amount of torque the motor generator unit supplies to or removes from the powertrain is based on both the current gear setting information and next gear setting information thereby matching transmission RPM (revolutions per minute) and internal combustion engine RPM.

10. The method of claim 1, wherein the amount of torque the motor generator unit supplies to or removes from the powertrain is based on optimizing fuel economy.

11. A method comprising:
controlling a motor generator unit to supply torque to or remove torque from a powertrain of a vehicle, wherein the motor generator unit is part of an electric motor drive retrofit system that has been retrofitted into the vehicle, wherein the vehicle includes an internal combustion engine and a transmission, wherein the motor generator unit is clutchlessly coupled to the internal combustion engine, wherein an amount of torque the motor generator unit supplies to or removes from the powertrain is determined based in part on a selected operating mode and on vehicle sensor information, and wherein the vehicle sensor information includes at least one of: a throttle position of the vehicle, and brake pressure information of the vehicle;
communicating performance information to a user interface device, wherein the performance information comprises operating characteristics of both the electric motor drive retrofit system and the internal combustion engine; and
presenting the performance information on the user interface device.

12. The method of claim 11, wherein the selected operating mode is selected via the user interface device.

13. A non-transitory computer readable medium comprising stored instructions, wherein when the instructions are executed by a processor cause the processor to:
control a motor generator unit to transfer torque between a powertrain of a vehicle and the motor generator unit, wherein the motor generator unit is part of a hybrid retrofit system that has been retrofitted into the vehicle, wherein the vehicle has an internal combustion engine and a transmission, wherein the motor generator unit is coupled between the transmission and the internal combustion engine, and wherein how torque is transferred between the motor generator unit and the powertrain is determined based in part on a selected operating mode and on vehicle sensor information, wherein the vehicle sensor information includes at least one of: a throttle position of the vehicle, and brake pressure information of the vehicle.

14. The non-transitory computer readable medium of claim 13, wherein when the instructions are executed by the processor, also cause the processor to:
receive vehicle sensor information onto a vehicle control unit, wherein the vehicle control unit is part of the hybrid retrofit system.

15. The non-transitory computer readable medium of claim 13, wherein torque is transferred between the motor generator unit and the powertrain based on: a state of charge of an energy storage device, motor temperature of the vehicle, location information of the vehicle, a gear setting of the vehicle, and a optimizing fuel economy.

16. The non-transitory computer readable medium of claim 13, wherein control of the motor generator unit is performed without interfering with normal operation of one or more engine control units of the vehicle.

17. A method comprising:
loading instructions on a memory of a vehicle control unit, wherein vehicle control unit is part of a hybrid retrofit system that includes a motor generator unit, wherein when the hybrid retrofit system is retrofitted onto a vehicle having an internal combustion engine and a transmission, the motor generator unit maintains a direct coupling to the internal combustion engine, wherein the motor generator unit is coupled between the transmission and the internal combustion engine, wherein execution of the instructions by a processor cause the motor generator unit to transfer torque between the input of the transmission and the motor generator unit based in part on a selected operating mode and on vehicle sensor information, and wherein the vehicle sensor information includes at least one of: a throttle position of the vehicle, and brake pressure information of the vehicle.

18. The method of claim 17, wherein execution of the instructions by the processor also causes vehicle sensor information to be received onto the vehicle control unit.

19. The method of claim 17, wherein control of the motor generator unit is performed without interfering with normal operation of any engine control unit of the vehicle.

20. The method of claim 17, wherein torque is transferred between the motor generator unit and the input of the transmission based on: a state of charge of an energy storage device, motor temperature of the vehicle, location information of the vehicle, a gear setting of the vehicle, and optimizing fuel economy.

* * * * *